United States Patent
Maltsev et al.

(10) Patent No.: US 11,923,952 B2
(45) Date of Patent: Mar. 5, 2024

(54) DISTRIBUTED RELAY

(71) Applicant: Intel Corporation, Santa Clara, CA (US)

(72) Inventors: Alexander Maltsev, Nizhny Novgorod Niz (RU); Ali Sadri, San Diego, CA (US); Andrey Pudeyev, Nizhny Novgorod (RU); Liang Xian, Portland, OR (US); Fatemeh Fazel Sarjoui, Hillsboro, OR (US); Cheng-Yuan Chin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 17/056,658

(22) PCT Filed: Sep. 27, 2019

(86) PCT No.: PCT/US2019/053381
§ 371 (c)(1),
(2) Date: Aug. 25, 2021

(87) PCT Pub. No.: WO2020/123012
PCT Pub. Date: Jun. 18, 2020

(65) Prior Publication Data
US 2022/0069895 A1    Mar. 3, 2022

Related U.S. Application Data

(60) Provisional application No. 62/777,416, filed on Dec. 10, 2018.

(51) Int. Cl.
H04B 7/14      (2006.01)
H04B 7/026     (2017.01)
(Continued)

(52) U.S. Cl.
CPC ......... *H04B 7/15528* (2013.01); *H04B 7/026* (2013.01); *H04B 7/0617* (2013.01); *H04B 7/10* (2013.01)

(58) Field of Classification Search
CPC .. H04B 7/15528; H04B 7/026; H04B 7/0617; H04B 7/10
See application file for complete search history.

(56) References Cited

U.S. PATENT DOCUMENTS 5,115,514 A   5/1992  Leslie
5,765,099 A   6/1998  Georges et al.
(Continued)

OTHER PUBLICATIONS

International Search Authority, PCT Search Report issued for PCT/US2019/053381, 2 pgs., dated Dec. 6, 2019.

*Primary Examiner* — Erika A Washington
(74) *Attorney, Agent, or Firm* — Banner & Witcoff Ltd.

(57) ABSTRACT

This disclosure describes systems, methods, and devices related to a distributed relay. The distributed relay may utilize beamforming and/or a specific physical arrangement of transmit and receive antennas to ensure a high isolation between antennas. The distributed relay may further facilitate the concurrent operation of two different intermediate frequency (IF) chains to support communications between a network entity and user device, receiving and transmitting data on each of the two IF chains independently of one another.

22 Claims, 21 Drawing Sheets

(51) Int. Cl.
  *H04B 7/06*  (2006.01)
  *H04B 7/10*  (2017.01)
  *H04B 7/155*  (2006.01)

(56) References Cited

U.S. PATENT DOCUMENTS

| | | | |
|---|---|---|---|
| 2004/0166802 A1* | 8/2004 | McKay, Sr. | H04B 7/1555 |
| | | | 455/7 |
| 2015/0063176 A1 | 3/2015 | Hong et al. | |
| 2015/0195055 A1 | 7/2015 | Ben-Shlomo | |
| 2017/0353338 A1* | 12/2017 | Amadjikpe | H01Q 21/065 |
| 2018/0054264 A1* | 2/2018 | Yu | H04L 27/34 |
| 2018/0254805 A1 | 9/2018 | Sadri et al. | |

* cited by examiner

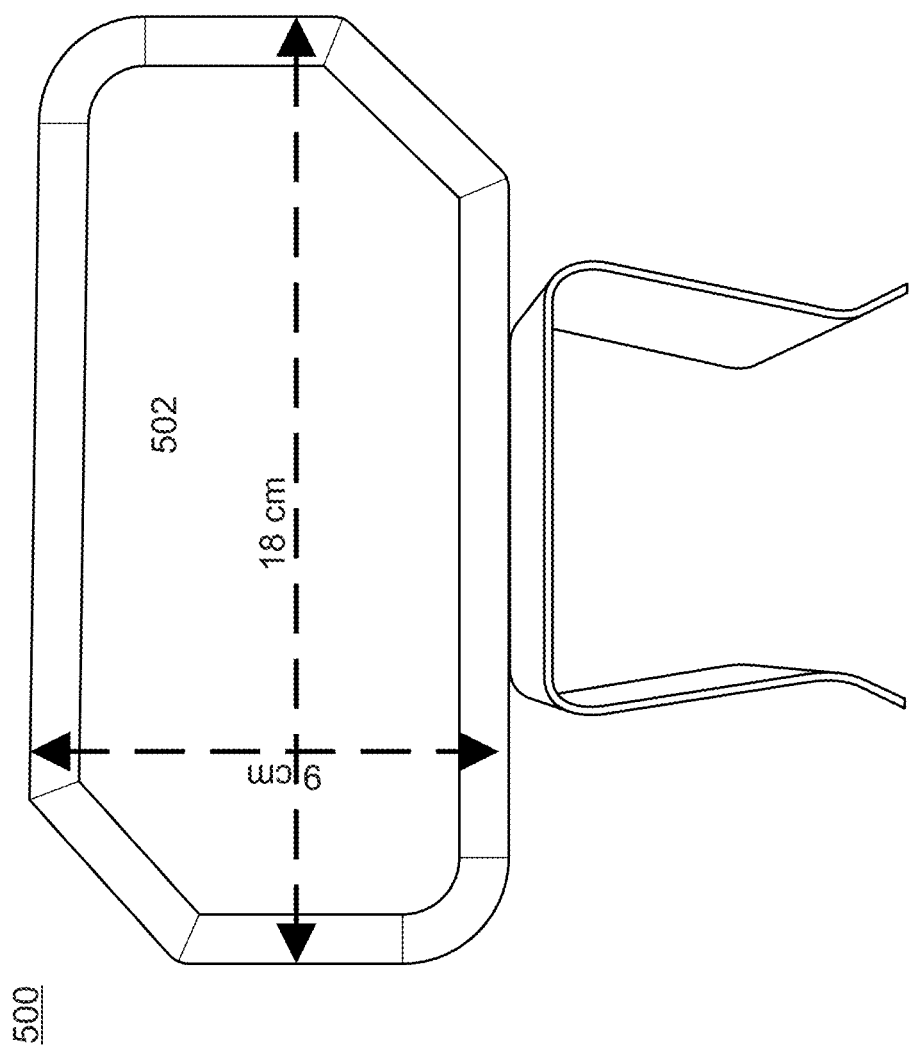

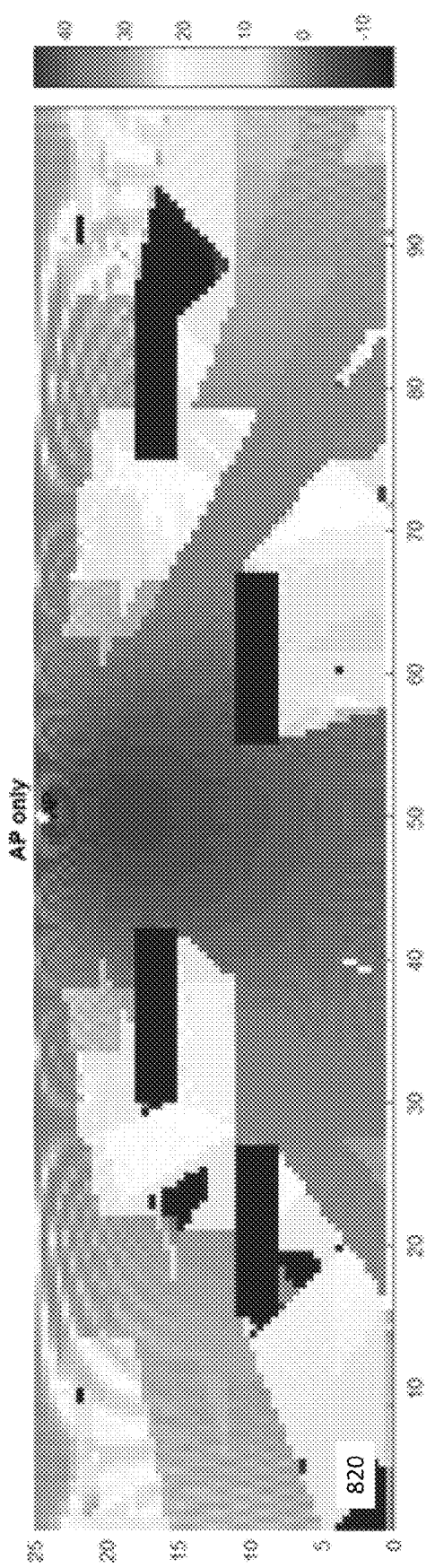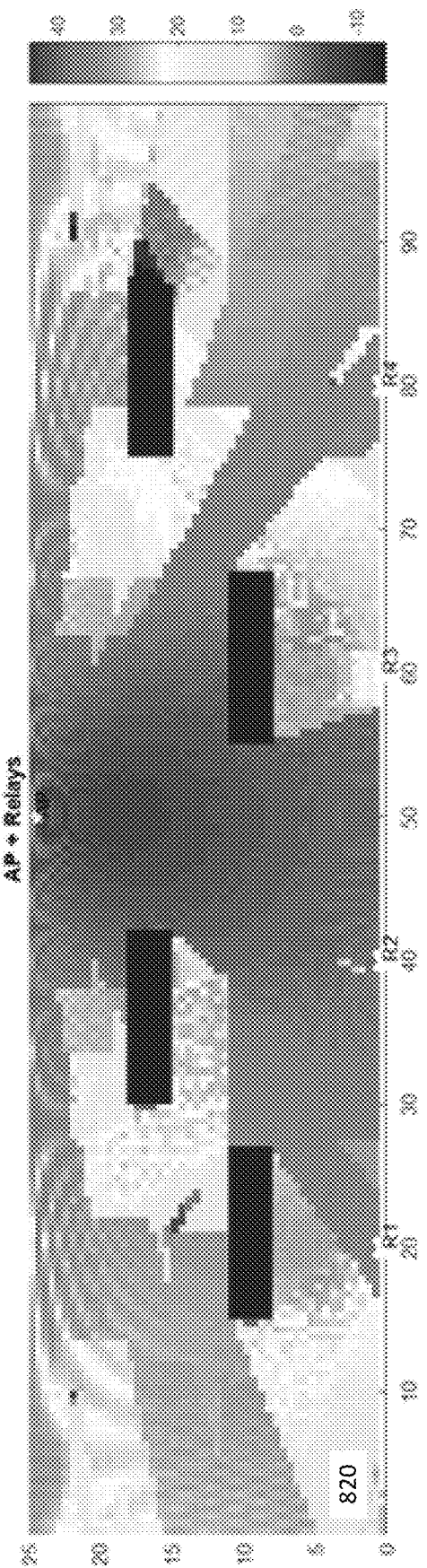
FIG. 9A
FIG. 9B

DISTRIBUTED RELAY

CROSS-REFERENCE TO RELATED APPLICATIONS

This application claims priority to U.S. provisional patent application No. 62/777,416, filed on Dec. 10, 2018, which is hereby incorporated by reference in its entirety.

TECHNICAL FIELD

This disclosure generally relates to systems and methods for wireless communications and, more particularly, to the implementation and architecture of distributed relays.

BACKGROUND

Wireless devices are becoming widely prevalent and are increasingly requesting access to wireless channels. The growing density of wireless deployments require increased network and spectrum availability. Current techniques to improve wireless coverage areas have been inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 5A depicts one example relay implementation, in accordance with an embodiment of the present disclosure.

FIGS. 9A-9C illustrate a comparison of SNR for various cases in accordance with the scenario model as shown in FIG. 8, in accordance with an embodiment of the present disclosure.

The exemplary aspects of the present disclosure will be described with reference to the accompanying drawings. The drawing in which an element first appears is typically indicated by the leftmost digit(s) in the corresponding reference number.

Figure 1:
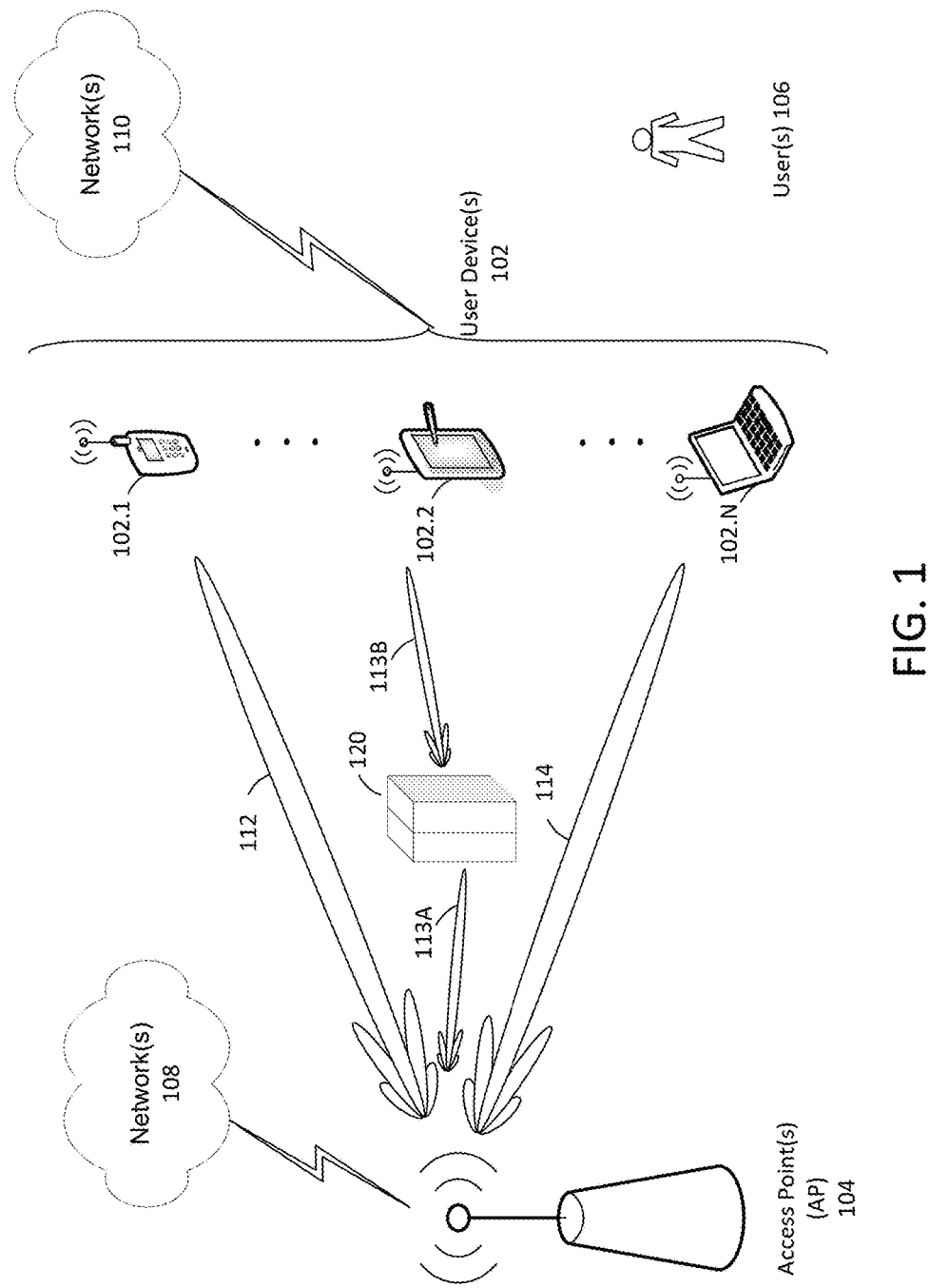
FIG. 1 is a network diagram illustrating an example network environment for a distributed relay, in accordance with an embodiment of the present disclosure.

SUMMARY 5G strives to achieve connect billions of devices with multi-gigabit speeds, lower latency, improved coverage and reliability, low-cost, energy efficient, and environmentally-friendly operation. The mmWave bands are considered as of the frequencies of choice for 5G, and initially were designated for Fixed Wireless Access (FWA). Moreover, it is well-known that signals in the millimeter-wave bands (e.g., 28-70 GHz) have a propagation of a quasi-optic nature, so various obstacles severely decrease the signal strength, unlike in the lower bands. For instance, mmWave signal strength is susceptible to severe attenuation by objects in the propagation path such as rain, trees, walls, tinted glass, etc.

In addition, line-of-sight (LOS) transmission provides the highest signal power, but it is difficult to provide reliable service in accordance with LOS applications. And while beamforming and large aperture mmWave antenna arrays can overcome the large path loss, mobile devices have limited capabilities to include this feature, and blockage and non-LOS (NLOS) operation can significantly reduce the coverage.

Previous relay solutions in the mmWave bands are mainly retransmission devices for local multipoint distribution service (LMDS) at 28 GHz. These devices have a lower bandwidth and different design, however, and are not intended for simultaneous transmission and reception. Furthermore, the main disadvantage of the LMDS relaying systems is increased latency, as conventional LMDS relays are not capable of simultaneous transmission and reception, and thus distributed solutions have not been implemented in accordance with LMDS solutions. In particular, distributed solutions include a relay device that receives a signal, decodes the signal, re-encodes the signal, and then transmits the re-encoded signal. Doing so, however, incurs significant processing delays, and the use of the additional hardware to perform the aforementioned functions also increases the cost of the device. As another disadvantage, conventional LMDS systems are based on fixed directional antennas that require careful alignment and adjustment upon installation.

Thus, with the implementation of mmWave bands and the further popularization of IEEE 802.11 60 GHz solutions, a cheap and reliable device is needed to improve the coverage in the areas where direct transmissions from the base station is weak. To resolve these issues, example embodiments of the present disclosure relate to systems, methods, and devices for distributed relay implementations.

In one or more embodiments, a distributed relay may facilitate a distributed relay solution, which may include the mmWave bands or any other suitable frequency band of operation. The embodiments described herein primarily focus on mmWave bands of operation, which may be particularly well served by the functionality provided by the embodiments based upon the quasi-optic propagation of mmWave signals as discussed above. However, the embodiments described herein may be implemented in accordance with any suitable frequency band or frequency bands of operation, and are not limited to the mmWave frequency bands.

As referenced herein, the term "mmWave frequency," or "mmWave bands," which the aspects described herein may operate, may include, for example, frequencies and frequency bands above 20 GHz, 24 GHz, 28 GHz, etc., up to an upper frequency. For instance, mmWave frequency bands may include frequencies ranging from 20 GHz to 300 GHz, from 24 GHz to 300 GHz, etc. This may include, for instance, the various bands known to be associated with or otherwise referred to as mm-Wave frequency bands such as 24 GHz, 28 GHz, 37 GHz, 39 GHz, 40 GHz, 47 GHz, 60 GHz, etc.

The embodiments of the distributed relay system, which may include one or more distributed relays working alone or in conjunction with an access point as further described herein, may facilitate beamforming for access and relay links that significantly simplifies installation and maintenance, and increases coverage. Furthermore, the embodiments of the mmWave distributed relay system allow for a transparent distributed solution with simultaneous transmission and reception, which enables standard-independent (band-dependent) operation without latency overhead. In the embodiments discussed herein, the distributed relay system may also advantageously provide a high relay amplification to facilitate a feasible solution for both indoor and outdoor scenarios.

As further discussed herein, these advantages are made possible with the unique design of the steerable antenna arrays, ensuring a very high isolation (e.g., about 40 dB) between the transmit (TX) and receive (RX) chains due to antenna placement and polarizations. In addition, special filtering on the intermediate frequency (IF) within a device helps to suppress unwanted echo signals, and ensures that only signals within a pre-defined frequency band are relayed.

The embodiments of the distributed relay system may be implemented as an essential part of mmWave deployments (e.g., 5G or IEEE 802.11ad-ay), covering holes in the coverage caused by signal blockage. Furthermore, and as further disused below, the distributed relay system embodiments described herein may implement a design that obviates baseband signal processing, facilitating a low cost, low latency, and standard-independent solution. Devices implementing the techniques discussed herein with respect to the distributed relay system embodiments may thus be easily installed (i.e., beamforming provides automatic relay link alignment) to fully cover a required area, without the latency increases mentioned above. This maintains the deployment on par with the increased latency requirements posed by 5G. Simulations in different indoor and outdoor scenarios for 28 and 60 GHz have proven the feasibility of the proposed embodiments of the mmWave distributed relay system.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Moreover, the following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

FIG. 1 is a network diagram illustrating an example network environment for a distributed relay, in accordance with an embodiment of the present disclosure. As shown in FIG. 1, the wireless network 100 may include any suitable number N of user devices 102.1-102.N, any suitable number of network entities such as access points(s) (AP) 104, and any suitable number of distributed relays 120, which may communicate with one another in accordance with any suitable number and/or type of communication protocols (e.g. IEEE 802.11 communication standards such as IEEE 802.11ay, IEEE 802.11ad, millimeter-wave, WiGig, etc.). The user device(s) 102.1-102.N may be implemented as any suitable type of device configured to wirelessly receive and transmit data, such as mobile devices that are non-stationary (e.g., not having fixed locations) or as stationary devices.

Moreover, although the AP 104 is shown in FIG. 1 as communicating via multiple antennas with user devices 102.1 and 102.N, this is for illustrative purposes only, and any suitable number user devices 102.1-102.N may additionally or alternatively communicate with other user devices 102 and/or with the AP 104. Although a single AP 104 and a single relay 120 are shown in FIG. 1 for purposes of brevity, embodiments include the wireless network 100 operating using any suitable number of APs 104 and/or distributed relays 120. The term "Access point" or "AP" as used herein may apply to any suitable type of network entity that is used in accordance with a wireless network in which the relay 120 may operate. For example, the AP 104 may be implemented as a Wi-Fi access point, a base station, a gNodeB, an eNodeB, etc.

One or more of the user device(s) 102.1-102.N and/or AP(s) 104 may be operable by one or more user(s) 106. In an embodiment, any addressable unit may be considered a station (STA). An STA may take on multiple distinct characteristics, each of which are related to its function. For example, a single addressable unit might simultaneously be a portable STA, a quality-of-service (QoS) STA, a dependent STA, and a hidden STA. The one or more user device(s) 102.1-102.N, as well as the AP(s) 104, may be STAs. The one or more user device(s) 102.1-102.N and/or AP(s) 104 may operate as a personal basic service set (PBSS) control point/access point (PCP/AP). The user device(s) 102.1-102.N and/or AP(s) 104 may also include mesh stations in, for example, a mesh network, in accordance with one or more IEEE 802.11 standards and/or 3GPP standards.

As an example, user device(s) 102.1-102.N and/or AP(s) 104 may be implemented as a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the user device(s) 102.1-102.N and/or the AP(s) 104 may be configured to communicate with each other via one or more communications networks 108 and/or 110 in a wireless or wired manner. The user device(s) 102.1-102.N may also communicate peer-to-peer or directly with each other with or without the AP(s) 104. Any of the communications networks 108 and/or 110 may include, but are not limited to, any suitable combination of different types of communications networks to support communications such as, for example, broadcasting networks, cable networks, public networks (e.g., the Internet), private networks, wireless networks, cellular networks, or any other suitable private and/or public networks.

Further, any of the communications networks 108 and/or 110 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 108 and/or 110 may include any suitable type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

One or more of the user device(s) 102.1-102.N and/or the AP(s) 104 may include one or more communications antennas. The one or more communications antennas may be any suitable type of antenna that may facilitate wireless data transmission and/or reception in accordance with the communications protocols used by the user device(s) 102.1-102.N and/or the AP(s) 104. Some non-limiting examples of suitable antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, pseudo- or quasi-omnidirectional antennas, or the like. The one or more communications antennas may be communicatively coupled to a radio component of each respective device to enable each of the user devices 102.1-102.N and/or AP(s) 104 to transmit and/or receive signals, such as communications signals to and/or from the other user devices 102.1-102.N and/or AP(s) 104.

One or more of the user device(s) 102.1-102.N and AP(s) 104 may be configured to perform directional wireless communications, which may include directional transmission and/or directional reception. One or more of the user device(s) 102.1-102.N, the AP(s) 104, and/or the distributed relay(s) 120 may be configured to perform such directional communications using a set of multiple antenna arrays (e.g., directional multi-gigabyte (DMG) antenna arrays or any other suitable type of antenna arrays configured to perform MIMO beamforming functions).

Each of the multiple antenna arrays may be used for transmission and/or reception in a particular respective direction or range of directions. One or more of the user device(s) 102.1-102.N, the AP(s) 104, and/or the distributed relay(s) 120 may be configured to perform any suitable given directional transmission towards one or more defined transmit sectors. Moreover, one or more of the user device(s) 102.1-102.N, the AP(s) 104, and/or the distributed relay(s) 120 may be configured to perform any given directional reception from one or more defined receive sectors. Furthermore, MIMO beamforming may be accomplished using RF beamforming and/or digital beamforming. In some embodiments, in performing a given MIMO transmission, user devices 102.1-102.N, the AP(s) 104, and/or the distributed relay(s) 120 may be configured to use all or a subset of its one or more communications antennas to perform MIMO beamforming.

Any of the user devices 102.1-102.N, the AP(s) 104, and/or the distributed relay(s) 120 may include any suitable radio and/or transceiver for transmitting and/or receiving signals (e.g., radio frequency (RF) signals) in the bandwidth and/or channels corresponding to the communication protocols utilized by any of the user device(s) 102.1-102.N, the AP(s) 104, and/or the distributed relay(s) 120 to communicate with one other. The radio components may include hardware and/or software to modulate and/or demodulate communication signals according to any suitable communication protocols. For example, such radio components may implement hardware and/or software instructions to communicate via one or more Wi-Fi and/or Wi-Fi direct protocols, as standardized by the Institute of Electrical and Electronics Engineers (IEEE) 802.11 standards. To provide additional examples, such radio components, in cooperation with the antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay), 800 MHz channels (e.g., 802.11ah), etc. To provide additional examples, such radio components, in cooperation with the antennas, may be configured to communicate at 28 GHz and 40 GHz bands, or other bands associated with mmWave frequencies of operation.

Some embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

This list of communication channels in accordance with certain 802.11 standards is only a partial list provided by way of example and not limitation, and embodiments include other 802.11 standards (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio components may include any known receiver and baseband suitable for communicating via the communications protocols. The radio components may further include other suitable components to facilitate wireless communications such as, for instance, a low noise amplifier (LNA), additional signal amplifiers, an analog-to-digital (A/D) converter, one or more buffers, digital baseband processors, etc.

As further discussed herein, DMG communications may implement one or more directional links to communicate at a rate of multiple gigabits per second. An amendment to a DMG operation in a 60 GHz band, e.g., according to an IEEE 802.11ad standard, may be defined, for example, by an IEEE 802.11ay project. The phrases "directional multi-gigabit (DMG)" and "directional band (DBand)," as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 102.1-102.N, the AP(s) 104, and/or the distributed relay(s) 120 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project. Furthermore, it is understood that a basic service set (BSS) provides the basic building block of an 802.11 wireless LAN. For example, in infrastructure mode, a single access point (AP) together with all associated stations (STAs) is called a BSS.

In some embodiments, the user device(s) 102.1-102.N, the AP(s) 104, and/or the distributed relay(s) 120 may be configured to support one or more mechanisms and/or features, for example, channel bonding, single user (SU) MIMO, and/or and multi user (MU) MIMO. Such communications may be performed in accordance with an enhanced DMG (EDMG) Standard, an IEEE 802.11ay standard, and/or any other suitable standard and/or protocol. For example, embodiments include one or more of the user device(s) 102.1-102.N, the AP(s) 104, and/or the distributed relay(s) 120 being configured to communicate over a next generation 60 GHz (NG60) network, an EDMG network, and/or any other network.

In an embodiment, and with reference to FIG. 1, an initiator (e.g., AP 104) may be configured to communicate with one or more responders (e.g., non-AP STAs, such as, user devices 102.1-102.N). For example, for the AP 104 to establish communication with two devices (e.g., user device 102.1 and user device 102.N), the AP 104 may need to perform beamforming training with the user device 102.1 and the user device 102.N using beams 112 and 114, respectively. To do so, the AP 104 may transmit one or more sector sweep (SSW) frames over different antenna sectors defined by the one providing high signal quality between the AP 104 and the user device 102.1 and the user device 102.N. However, the SSW frames may reach the user device 102.2. It is understood that the above descriptions are for purposes of illustration and are not meant to be limiting.

To provide another example, in various scenarios, which are further discussed herein, the AP 104 may communicate with one of the user devices 102.1-102.N (user device 102.2 in this example) via the distributed reply 120. This may occur, for example, when the AP 104 and the user device 102.2 do not have line of sight with one another, when the user device 102.2 is located out or range of the AP 104, etc. Examples of these scenarios, as well as simulated results using the relay 120, are discussed further below. For instance, and as discussed further below, the one or more example embodiments of the relay 120 described herein may have various applications. For instance, although not shown in the Figures, embodiments of the relay 120 be implemented as part of an urban environment coverage enhancement. In such a case, the city environment direct path can be blocked by buildings, vehicles, and many other objects. Thus, the embodiments described herein may help to overcome outage problems caused by such obstacles by positioning relay devices at various points throughout an urban environment such as street lights, affixed to buildings, etc.

As another example, a distributed relay implemented in accordance with the embodiments described herein may be used in virtual reality (VR) applications. This may include, for instance, VR scenarios in which multigigabit transmission of uncompressed real-time high-definition video to operator helmets. Given the advantageous manner in which the delays and interruptions discussed herein are reduced or fully eliminated, the distributed relays may help avoid accidental blockage caused by player movement (especially in large VR playgrounds.)

As further discussed herein, the distributed relay 120 may facilitate bridging the communications between the AP 104 and the user device 120.2 (in this example). The distributed relay 120 may do so by receiving signals transmitted via the AP 104 using the beam 113A, and re-transmitting the signals to the user device 102.2 using the beam 113B. The relay 120 may do so in accordance with the embodiments as further described herein, which includes using beamforming and antennas having a threshold level of isolation between one another. Moreover, the relay 120 may perform amplify-and-relay functionalities without fully downconverting the signals received from the AP 104 to baseband prior to re-transmitting the signals to the user device 102.2, thus ensuring a low latency is maintained.

Of course, although only one direction of communication is described in this example (the transmission from the AP 104 to the user device 102.2), embodiments include the relay 120 also functioning to relay communications in the opposite direction (data transmitted from the user device 102.2 to the AP 104) in a similar manner. Furthermore, although not shown in FIG. 1 but as further discussed below, the wireless network 100 may include any suitable number of distributed relays 120, with several distributed relays 120 being located in the path between the AP 104 and the user devise 102.1-102.N. In this way, several distributed relays 120 may be chained together, each amplifying and forwarding data received from the previous relay 120 to form multiple "hops" to support communications between the AP 104 and the user device 102.

Figure 13:
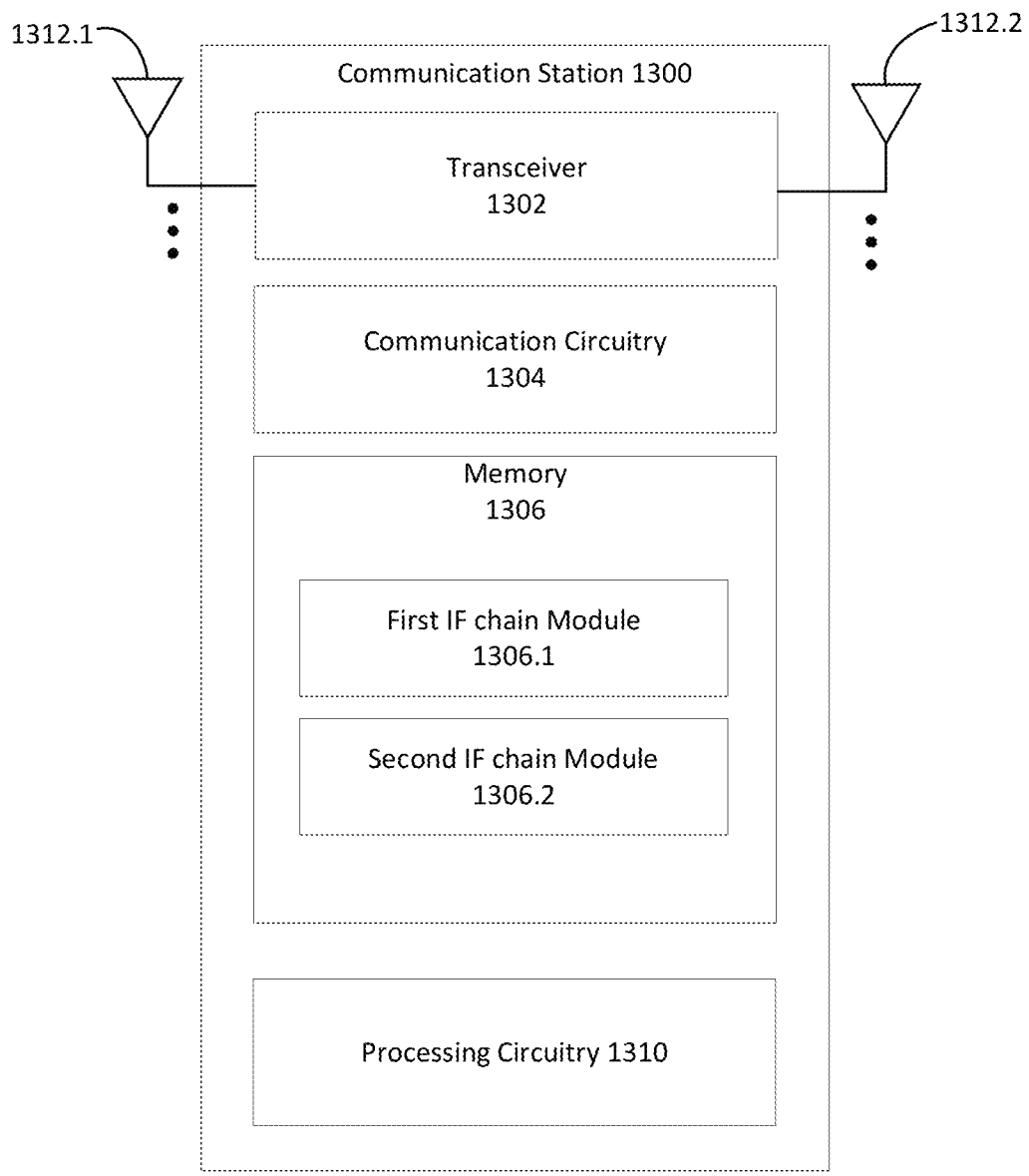
FIG. 13 illustrates a device, in accordance with an embodiment of the present disclosure.
Figure 14:
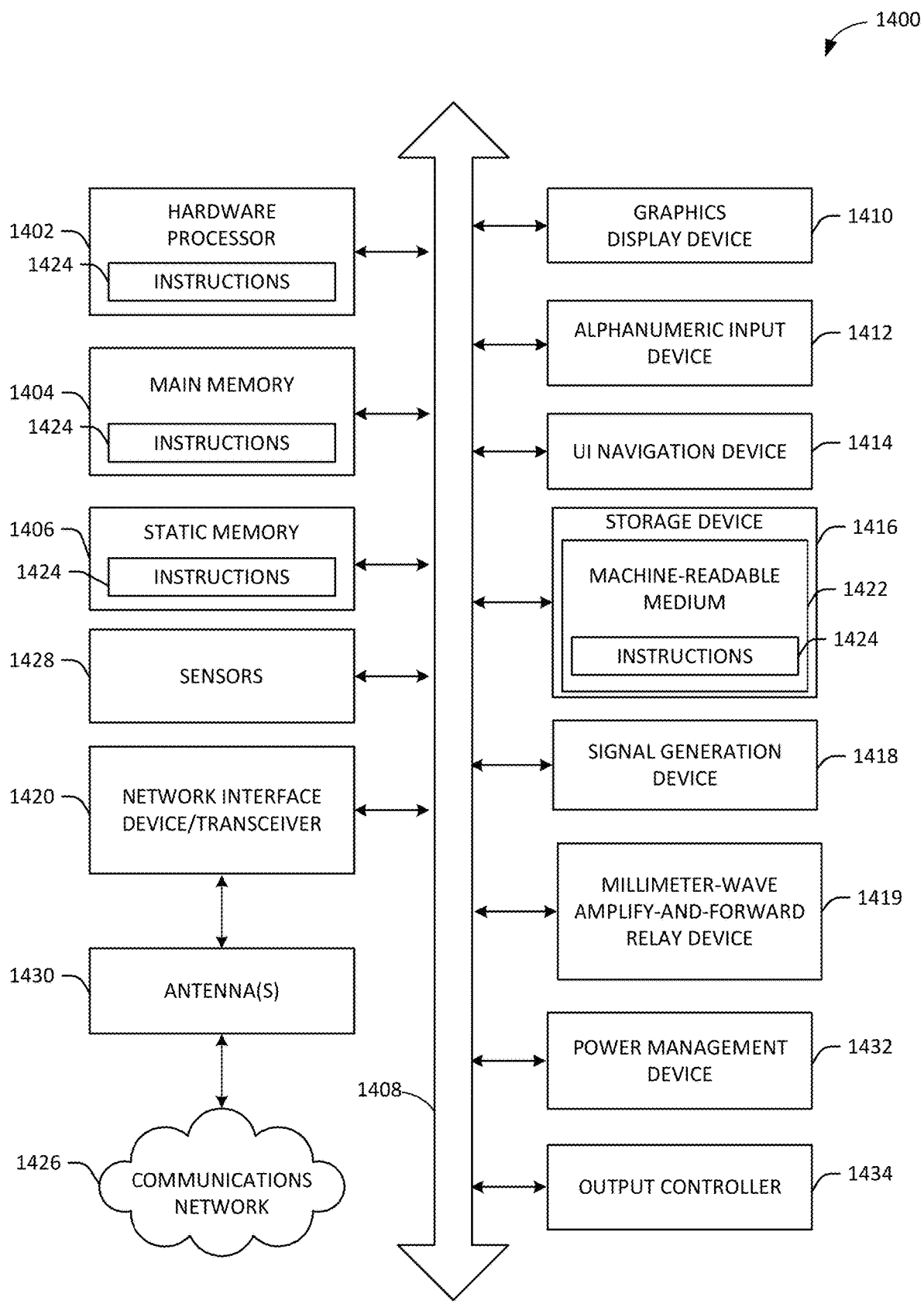
FIG. 14 illustrates a block diagram of an example system that may be used to implement any of one or more techniques (e.g., methods), in accordance with an embodiment of the present disclosure.

This process is discussed in further detail below with reference to FIG. 3, which provides additional details regarding the architecture implemented by the relay 120. Furthermore, as further discussed below, in some embodiments, the relay 120 may include one or more computer systems, processing circuitry, and/or components similar or identical to those described herein with reference to the example device 1300, as shown in FIG. 13 and/or the example system 1400, as shown in FIG. 14. The user devices 102.1-102.N and/or the AP 104 may also include one or more computer systems, processing circuitry, and/or components similar to those described herein with reference to the example device 1300, as shown in FIG. 13 and/or the example system 1400, as shown in FIG. 14, excepting for differences to support the additional amplify and forward functions performed by the relay 120, as discussed herein.

Figure 2:
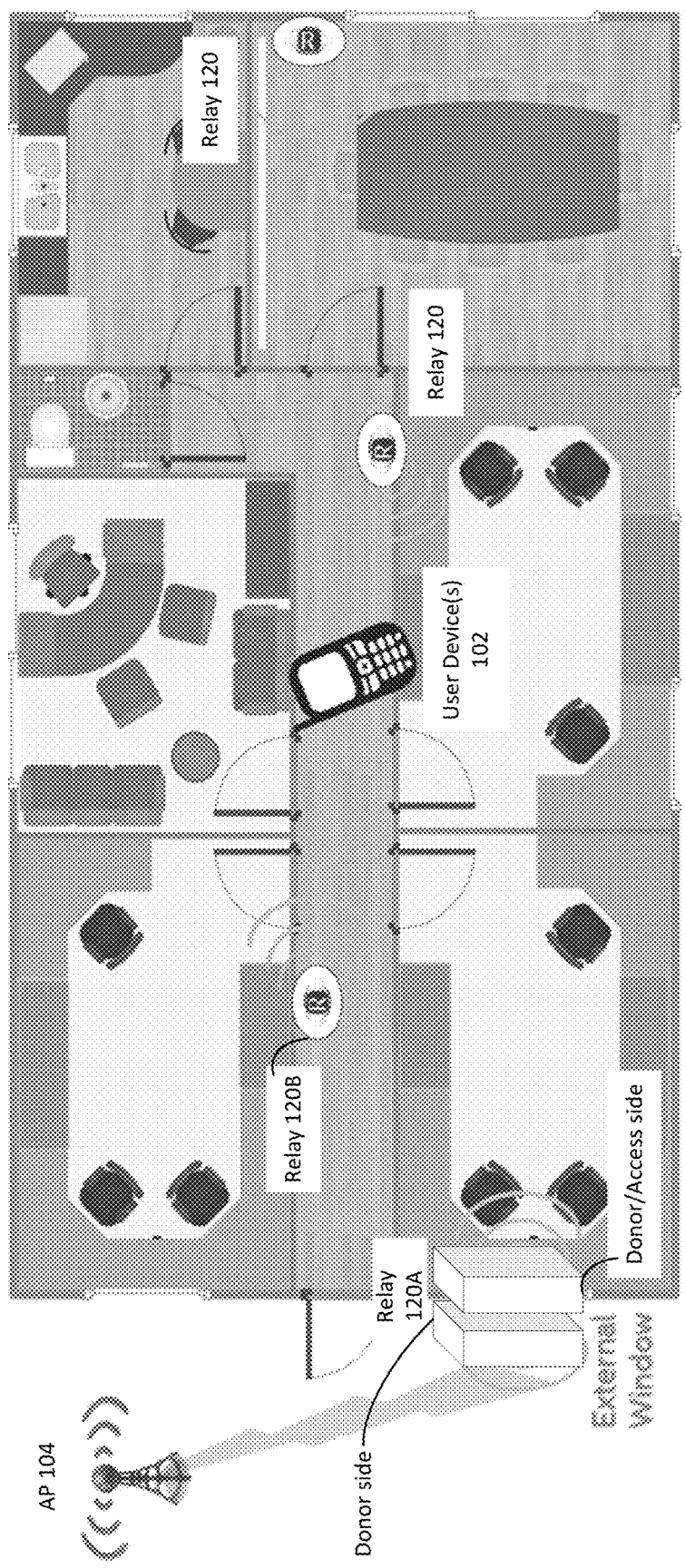
FIG. 2 is an example network that includes an indoor coverage area, in accordance with an embodiment of the present disclosure.

With regards to indoor coverage, and with reference to the wireless system 200 as shown in FIG. 2, it is common for signals from an AP (e.g., AP 104), which may be implemented as a gNodeB or gNB in this example that operates in accordance with mmWave frequencies, being unable to reach indoor areas due to very high wall penetration losses. However, distributed relays 120 implemented in accordance with the embodiments described herein (each marked with an "R" in FIG. 2) can serve as 'gates' for propagating signals indoors to provide supplemental wireless coverage. With further reference to FIG. 2, the relay 120A as shown may include a "donor" or "backhaul" side, which facilitates communications with the AP 104, and another side that may operate as either a donor or an "access" side that facilities communications between other relays 120 or any user devices 102, as the case may be.

In other words, and as further discussed below, each relay 120 may operate in either a donor-access mode or a donor-donor mode, and each relay 120 may dynamically adjust its operating mode depending upon channel conditions, the availability of AP signals, the range of user devices and other relays, etc. For example, as shown in FIG. 2, the relay 120A may be an example of a relay operating in a donor-access mode to facilitate communications between the AP 104 (on the donor side), and the user device 102 (on the access side). Thus, the relay 120 enables the AP 104 and the user device 102 to communicate with one another using "one-hop' via the relay 120A. However, if the user device 102 is too far outside the range of the relay 120A, then the relay 120A may switch to operate in a donor-donor mode. In the donor-donor mode of operation, the relay 120A may still communicate with the AP 104 on one donor side, but also communicate with the relay 120B on a second donor side. The relay 120B may, in this scenario, function in a donor-access mode of operation, with the donor side communicating with the relay 120A and the access side communicating with the user device 102. In this example, the AP 104 and the user device 102 may be said to communicate with one another in accordance with a "two hop" scenario, with one hop being identified with each relay 120 used to facilitate communications in this manner. Further details regarding the donor-donor and donor-access modes or operation are further discussed below.

Furthermore, the embodiments described herein may facilitate separate sets of antennas for communications via each donor or access side, as the case may be. These separate sets of antennas may be implemented as separate panel units or as part of the same panel unit or housing, with the antennas spaced on different sides of the particular housing or panel assembly that is used, as further discussed below. In embodiments, each separate set of antennas may be implemented as independently electronically-controlled phased arrays. In this configuration, each separate set of phased arrays may be utilized in accordance with any suitable type of beamforming and beamsteering technique, depending upon the particular mode of operation of the relay 120.

For instance, because donor-side communications may support point-to-point communications between the AP 104 and the relay 120 (or between two relays 120), the phased array associated with the donor side of the relay 120 may enable beamforming, beamsteering, and tracking, to produce a narrow beam with a high gain to account for mmWave propagation losses. As another example, access-side communications may support point to multi-point communications between the relay 120 and several user devices 102 spread over a wide area. Thus, the phased array of the relay 120 associated with access side communications may facilitate beamforming using a wider beam and lower gain than the donor side of the relay 120, and may not require the beamsteering and tracking. In an embodiment, each separate phased array of the AP relay 120 may be configured to operate in either of the aforementioned donor or access modes, with the appropriate beamforming weighting being supplied in each case as using digital control such that the mode of operation of either side of the relay 120 may be dynamically changed, as noted above.

Again, the relay 120A as shown in FIG. 2 may include two separate sides, each side being associated with different phased array antennas and other hardware, as further discussed below with respect to FIG. 3A. This may be particularly useful, for instance, to facilitate the indoor distribution of high frequency mmWave signals from the outside of a building to the inside of a building as shown in FIG. 2. For example, the two separate sides of the relay 120A may be physically separated from one another through a wall, a window, etc. The space between with each side may be coupled to one another via a transmission medium that includes a physical link or a wireless link, as further discussed below. Because the donor side of the relay 120 may downconvert the higher received frequency to an intermediate (IF) frequency, the communication between the two sides of the relay 120 may advantageously occur within the IF domain, which does not suffer from large propagation loss through physical barriers or over the air as compared to higher frequencies (e.g., mmWave frequencies). The access/donor side of the relay 120 may then up-convert the IF frequency signals received form the donor side to the appropriate, higher frequency for communication with another relay 120 or a user device 102, as the case may be.

Figure 3A:
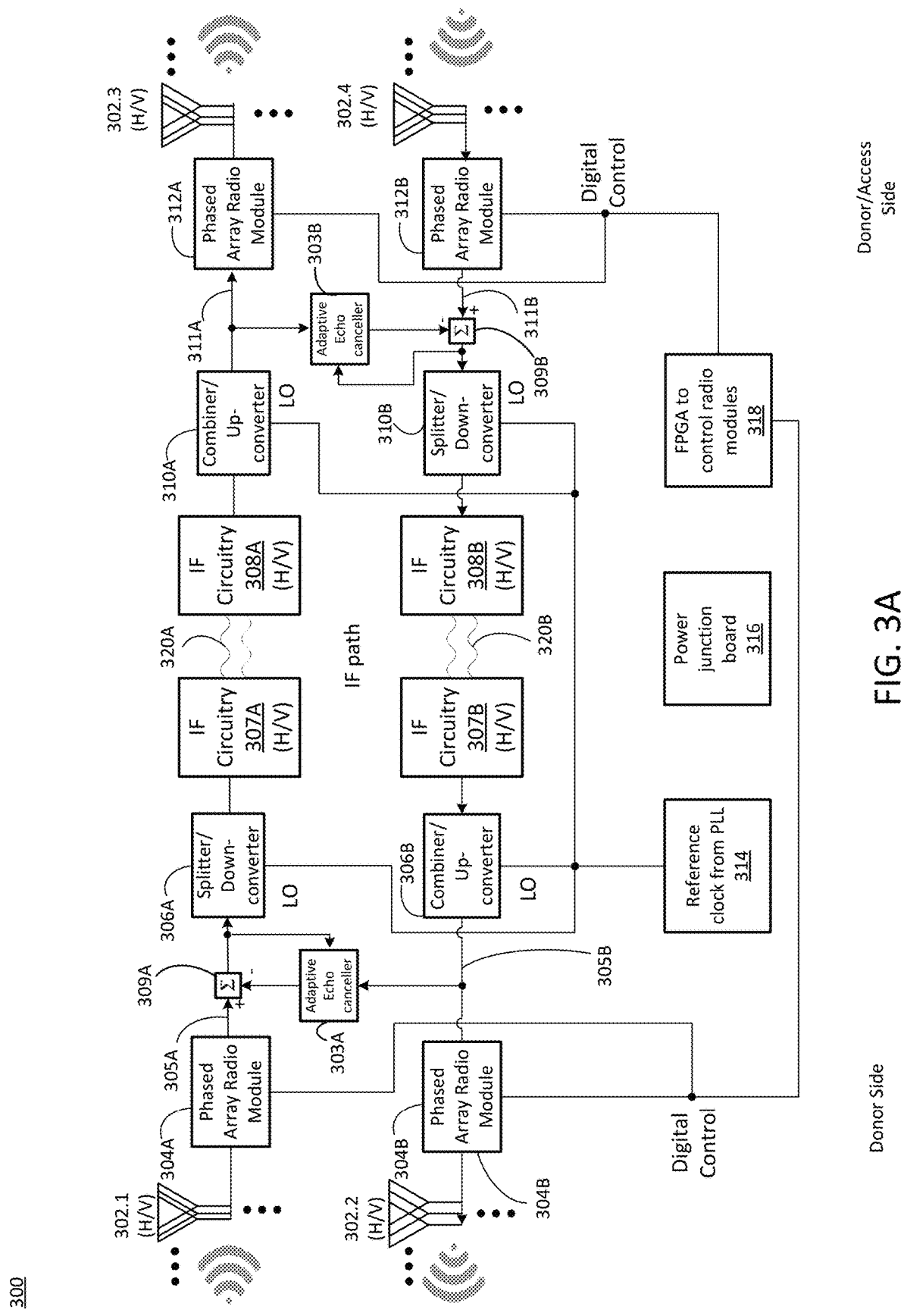
FIG. 3A is an example hardware architecture associated with a distributed relay, in accordance with an embodiment of the present disclosure.

FIG. 3A is an example hardware architecture associated with a distributed relay, in accordance with an embodiment of the present disclosure. The example architecture 300 as shown in FIG. 3A may be implemented as part of a device used in accordance with the distributed relay embodiments as discussed herein. For instance, the example architecture 300 may be associated with the relay 120, as shown in FIG. 1 and FIG. 2, as well as the other distributed relays marked with an "R" throughout the Figures to facilitate communications between an AP (e.g., a gNB) and one of more user devices or one or more other distributed relays.

As shown in FIG. 3A, the example architecture 300 illustrates four antennas in total, with two antennas (one TX antenna 302.2 and one RX antenna 302.1) being configured to perform backhaul link communications or communications with another distributed relay device (e.g. relay 120) and/or another suitable AP (e.g. AP 104). The other two antennas (one TX antenna 302.3 and one RX antenna 302.4) are configured to perform donor or access link communications with another distributed relay device (e.g. relay 120) (in donor mode) or one or more UEs (e.g. user devices 102.1-N) in access mode.

As shown in FIG. 3, signals are transferred between the donor side and the donor/access side via intermediate frequency (IF) chains, with amplifiers to set the appropriate signal level at the TX outputs. In particular, the architecture 300 includes phased array radio modules 304A. 304B, 312A, 312B, each being coupled, respectively, to the antennas 302.1, 302.2, 302.3, and 302.4. In this example, the antennas 302.1, 302.2, 302.3, and 302.4 may be implemented as separate phased arrays that are electronically controlled via each respectively coupled phased array radio module 304A, 304B, 312A, 312B.

The phased array radio modules 304A. 304B, 312A, 312B may include any suitable combination of hardware circuitry and software that is controlled by the FPGA 318 as shown to facilitate beam control that may include beamforming, beamsteering, and/or beam tracking for the transmission and reception of signals as appropriate. The beam control may be performed in accordance with any suitable type of technique, including known techniques, which may set the amplitude weighting and phase of each of the antenna elements included in each respective phased antenna array to produce the desired beam shape, angle, and to adjust and adapt the beam shape and/or angle as needed. Thus, the phased array radio modules 304A, 312B may be implemented with any suitable type of receiver circuitry configured to receive signals provided by the antennas 302.1, 302.4, respectively, to each respective IF chain as shown in FIG. 3. Moreover, the phased array radio modules 304B, 312A may be implemented with any suitable type of transmitter circuitry configured to transmit signals via the antennas 302.2, 302.3, respectively, to each respective IF chain as shown in FIG. 3.

Although the FPGA 318 is shown performing beam control functions, embodiments include the beam control being performed by any suitable device, such as a hardware processor, an application specific integrated circuit (ASIC), etc. In an embodiment, the FPGA 318 or other suitable control device may be implemented in a separately housed control unit, which may be coupled to each panel associated with the donor side and donor/access side, respectively.

In the example shown in FIG. 3A, the upper path or chain, which may be referred to herein as a an upper or first IF chain, may include the phased array radio module 304A coupled to the antenna 302.1, which may be coupled to the splitter and down-converter circuitry 306A using any suitable type of link such as an analog signal cable 305A, such as a coaxial cable, for example. The down-converter included in the splitter and down-converter circuitry 306A may include any suitable type of hardware such as mixers, for instance, to downconvert the signal received via the antenna 302.1 to an intermediate frequency (IF) using the supplied local oscillator (LO) signal.

The splitter included in the splitter and down-converter circuitry 306A may include, for instance, a duplexer or triplexer, etc., depending upon the application, which separates the signals received via the antenna 302.1 into respective frequency bands. These frequency band separated signals are then passed to the IF circuitry 307A (receive IF circuitry), which may include one or more filters, amplifiers, and/or echo cancellation circuitry to filter, amplify, and/or perform echo-cancellation on each signal within each respective frequency band to provide conditioned signals in the IF domain. The IF circuitry 307A may further include one or more hardware components configured to transmit the conditioned signals, at the IF frequency, across the transmission medium 320A. The transmission medium 320A thus separates the donor side of the architecture 300 from the donor/access side as shown in FIG. 3A.

As further discussed herein, various embodiments include the use of direct downconversion of received signals to baseband and the direct upconversion of signals from baseband to a transmission (RF) frequency, as well as the use of an IF frequency to do so. When an IF frequency stage is used for downconversion, the received signals may be split into their constituent frequency bands via the splitter/down-converter circuitry 306A, 310B in the IF domain. However, if no IF stage is used, then the signals may instead be split into their various frequency bands in the RF frequency domain.

The IF circuitry 308A (transmit IF circuitry) may include one or more hardware components configured to receive the conditioned signals transmitted via the IF circuitry 307A in the IF domain across the transmission medium 320A. Additional details regarding the hardware components and the various techniques in which the conditioned signals may be passed through the transmission medium 320A are further discussed below with reference to FIGS. 3B-3E. Additionally, the IF circuitry 308A may also include one or more filters, amplifiers, and/or echo cancellation circuitry to filter, amplify, and/or perform echo-cancellation on each received condition signal within each respective frequency band received over the transmission medium 320A to provide conditioned signals in the IF domain to the combiner and up-converter circuitry 310A.

The combiner and up-converter circuitry 310A may up-convert the conditioned signals received from the IF circuitry 308A to a suitable frequency for transmission via the antenna 302.3. The combiner and up-converter circuitry 310A may include any suitable type of up-converter (e.g. mixers) configured to up-convert the received signals using the provided LO signal. The combiner and up-converter circuitry 310A may include any suitable combiner circuitry configured to combine the up-converted signals and thus facilitate the transmission of the combined conditioned signals via the antenna 302.3 using the phased array radio module 312A. In this example, the upper chain may be associated with receiving signals via the donor side (e.g., an AP such as AP 104) using the antenna 302.1 and forwarding the signals to a user device (e.g. user device 102.2) or another relay 120 using the antenna 302.3.

Continuing this example, the lower path or chain, which may be referred to herein as a second IF chain, may include a phased array radio module 312B coupled to the antenna 302.4. The phased array radio module 312B may be coupled to the splitter and down-converter circuitry 310B using any suitable type of link such as an analog signal cable 311B, such as a coaxial cable, for example. The splitter and down-converter circuitry 310B may be configured to down-convert the signals received from the antenna 302.4 into the IF domain and separate the signals into respective frequency bands. Similar to the IF circuitry 307A, the IF circuitry 308B (receive IF circuitry) may perform filtering, amplification, and/or echo cancellation functions on each signal per frequency band received from the splitter and down-converter circuitry 310B to generate conditioned signals, and to cause the conditioned signals to be transmitted via the transmission medium 320B.

The lower path may also include IF circuitry 307B (transmit IF circuitry), which may receive the conditioned signals from the IF circuitry 308B and perform filtering, amplification, and/or echo cancellation functions on the received conditioned signals. The combiner and up-converter circuitry 306B may up-convert the conditioned signals received from the IF circuitry 307B to a suitable frequency for transmission via the antenna 302.2. The combiner and up-converter circuitry 307B may include any suitable type of up-converter (e.g. mixers) configured to up-convert the received signals using the provided LO signal. The combiner and up-converter circuitry 306B may include any suitable combiner circuitry configured to combine the up-converted signals and thus facilitate the transmission of the combined conditioned signals via the antenna 302.2 using the phased array radio module 304B. In this example, the lower chain may be associated with receiving signals via a user device (e.g. user device 102.2) or another relay 120 using the antenna 302.4 and forwarding the signals to the donor side (e.g., an AP such as AP 104) via the antenna 302.2.

As shown in FIG. 3A, each of the splitter and down-converter circuitry 306A, 310B and the combiner and up-converter circuitry 306B, 310A may also receive a local oscillator signal (LO), which may be generated via a reference clock source 314. The reference clock source may include a phase locked loop (PLL), a digital PLL, or any other suitable type of stable LO signal. The LO signal may have a frequency suitable for the downconversion or upconversion, as appropriate, of the signals received via each of the down-converter circuitry 306A, 310B and the combiner and up-converter circuitry 306B, 310A. Thus, embodiments include the down-converter circuitry 306A, 310B and the combiner and up-converter circuitry 306B, 310A being implemented with any suitable type of upconversion and/or downconversion circuitry (e.g., mixers, logic, etc.) to ensure that signals are downconverted to any suitable IF frequency and up-converted to the IF frequency as appropriate.

Thus, the each of the splitter and down-converter circuitry 306A, 310B and the combiner and up-converter circuitry 306B, 310A are configured to down-convert signals to a suitable IF frequency and up-convert the IF signals back to a transmission frequency. This IF frequency may be dependent upon the LO signal frequency, and may be selected in accordance with a particular application and/or communication protocol for which the relay 120 is used. In various embodiments, the IF frequency may be within a range of frequencies that is less than the transmission frequency, i.e. less than the frequency of signals received via the antennas 302.1, 302.4 and transmitted via antennas 302.2, 302.3 (e.g. a mmWave frequency) but greater than the baseband frequency. Thus, embodiments include the IF circuitry 308A, 308B within each of the upper and lower chains, respectively, performing various functions in the IF frequency domain without fully downconverting the received signals to baseband, which advantageously reduces the overall latency required to forward received signals. In other embodiments, the LO signal frequency may be set to the same frequency as the receiving or transmitting frequency (e.g. IF=0) to enable each respective IF chain to facilitate direct down-conversion of the received signals to baseband, and the direct up-conversion of the baseband signals to the transmit frequency.

Furthermore, embodiments include each of the components in the upper chain of the architecture 300 being configured to function independently of each of the components in the lower chain of the architecture 300. For example, each of the phased array radio modules 304A-D may be controlled in an independent manner via the FPGA (or other suitable component) 318. In the current example, this includes concurrently receiving and transmitting data in the upper chain from the donor side to the donor/access side (e.g., via antennas 302.1, 302.3) while receiving and transmitting data in the lower chain from the donor/access side to the donor side (e.g. via antennas 302.4, 302.2). In this way, the embodiments described herein advantageously enable the relay 120 to provide a transparent distributed relay solution with simultaneous transmission and reception. This further facilitates a standard-independent (e.g. band-dependent) operation without latency overhead.

Again, in an embodiment, the IF circuitry 307A, 308A, 307B, 308B may be implemented with various components. The components of each of IF circuitry 307A, 308A, 307B, 308B may be different or the same as one another. In various embodiments, the IF circuitry 307A, 308A, 307B, 308B may include any suitable combination of the various components and functionalities as discussed herein depending upon the particular application, cost considerations, etc. For example, the IF circuitry 307A, 308A, 307B, 308B may be implemented with any suitable number of bandpass filters depending upon the number of frequency bands associated with the signals received via the antennas 302.1, 302.4. In an embodiment, the IF circuitry 307A, 308A, 307B, 308B may include any suitable number of bandpass filters, which may have a predetermined or tunable frequency response, for each signal band included in the received signals. The bandpass filters may be implemented, for instance, such that the IF circuitry 307A, 308A, 307B, 308B may select only the needed signal band when desired.

Additionally or alternatively, the IF circuitry 307A, 308A, 307B, 308B may be implemented with one or more amplifiers (e.g., one for each communication band of operation). The amplifiers may have any suitable design, such as low-noise amplifiers (LNAs) for example. In some embodiments, the phased array radio modules 304B, 312A may include amplifiers in addition to or instead of those implemented via the IF circuitry 307A, 308A, 307B, 308B. When the IF circuitry 307A, 308A, 307B, and/or 308B implements the amplifiers in this manner, the IF circuitry 307A, 308A, 307B, and/or 308B may dynamically provide the appropriate amplifier settings (e.g., an appropriate target amplification value) depending upon the level of the received signals, noise considerations, etc., such that the appropriate signal level is set at the transmit outputs (e.g., at the phased array radio modules 304B, 312A and their respective antennas 302.2, 302.3).

This may include the appropriate signal level being set at the inputs to the phased array radio modules 304B, 312A taking into consideration whether additional signal amplification is applied via the phased array radio modules 304B, 312A. The appropriate signal level (e.g. target amplification value) may be determined in any suitable manner such as using feedback derived from the operating environment (e.g. by sniffing performed via the phased array radio modules 304A, 312B), according to a predetermined or known relationship between the signal level of the received signals and known operational information (e.g., gain responses) of the amplifiers, etc. The gain setting of the amplifiers used to establish the appropriate signal level at the transmit outputs may be predetermined (e.g. fixed or initially at a default setting) or adjustable.

Additionally or alternatively, the IF circuitry 307A, 308A, 307B, 308B may be implemented with echo cancellation circuitry to further reduce transmit-to-receive feedback and to compensate for any leakage that may be introduced when the antenna isolation is insufficient to prevent such leakages. Such echoes may be introduced, for instance, may include both "near" and "far" echo signal sources. Examples of near echoes may include echoes resulting from the signals transmitted on the same chain or from another chain within the architecture 300. For instance, when transmitting, the transmit antennas 302.2 and/or 302.3 may cause a portion of the transmitted signal to leak into the receive paths via the receive antennas 302.1 and/or 302.4. Far echoes may include, for instance, transmitted signals that reflect off of various objects and then couple back into the receive paths via the receive antennas 302.1 and/or 302.4. The embodiments described herein address both near and far echoes sources, as discussed herein.

For this implementation, an intermediate frequency (IF) echo cancellation circuitry may be utilized for further suppression of unwanted signal replicas. This may facilitate the suppression of unwanted signal echo signals, allowing only the desired signals within specific frequency bands to be passed through the IF circuitry 307A, 308A, 307B, and/or 308B and then transmitted (e.g., at the phased array radio modules 304B, 312A and their respective antennas 302.2, 302.3). This echo cancellation circuitry may be implemented as part of the IF circuitry 307A, 308A, 307B, 308B in accordance with any suitable echo cancellation techniques, which may include known techniques to do so.

For example, as shown in FIG. 3A, the top IF chain coupled between the antennas 302.1, 302.3 may include adaptive echo canceller circuitry 303A and summation circuitry 309A, and the bottom IF chain coupled between the antennas 302.2, 302.4 may include adaptive echo canceller circuitry 303B and summation circuitry 309B. Although shown in FIG. 3A as separate components, the adaptive echo canceller circuitry 303A, 303B and/or the summation circuitry 309A, 309B may be incorporated as part of one or more of the other IF chain components. For instance, the adaptive echo canceller circuitry 303A and summation circuitry 309A may be integrated as part of the IF circuitry 307A, the adaptive echo canceller circuitry 303B and summation circuitry 309B may be integrated as part of the IF circuitry 308B, etc.

The adaptive echo canceller circuitry 303A, 303B and/or the summation circuitry 309A, 309B are shown by way of example in FIG. 3A and not limitation, and thus may include additional, alternate, or fewer components. Moreover, the adaptive echo canceller circuitry 303A, 303B and/or the summation circuitry 309A, 309B may be coupled to other components via connections not shown in FIG. 3A for purposes of brevity. For example, the adaptive echo canceller circuitry 303A, 303B may be controlled (e.g., tap or filter weighting, filter length adjustments, delay line adjustments, etc.) by the FPGA 318 or another suitable processor component via one or more signal control lines, with the connections for the control signals being omitted for clarity.

In embodiments, the adaptive echo canceller circuitry 303A, 303B and accompanying summation circuitry 309A, 309B may function to cancel signals transmitted from the transmit antenna of one IF chain that are received via the receive antenna of another IF chain. For example, the antenna 302.2 of the bottom IF chain may transmit signals, which may be received via the antenna 302.1 of the top IF chain as shown in FIG. 3A. These signals may be coupled as a result of proximity of the two antennas 302.2, 302.1 to one another, or the signals transmitted from the antenna 302.2 may be reflected off of nearby obstacles and then be received via the antennae 302.1 as a result of the signals transmitted via the antenna 302.2 and the signals received via the antenna 302.1 being close to one another in terms of frequency, for instance. Similarly, the antenna 302.3 of the top IF chain may transmit signals, which may be received via the antenna 302.4 of the bottom IF chain.

For purposes of brevity, the operation of the adaptive echo canceller circuitry 303A, 303B and accompanying summation circuitry 309A, 309B is explained with reference to the adaptive echo canceller circuitry 303A and accompanying summation circuitry 309A, although the adaptive echo canceller circuitry 303B and accompanying summation circuitry 309B (as well as other echo canceller circuitry not shown in FIG. 3A but implemented via the architecture 300) may operate in an identical or substantially similar manner to mitigate the receipt of echo signals.

In an embodiment, the adaptive echo canceller circuitry 303A may include any suitable number of components configured to adaptively estimate the echo signal that is received via the antenna 302.1. To do so, the adaptive echo cancellation circuitry 303A may include any suitable number of delay lines having a fixed or adjustable length, adjustable of fixed filters, and/or taps that may be adjusted and/or weighted based upon the feedback received from the output of the summation circuitry 309A. For example, the adaptive echo canceller 303A may be coupled to the signals output from the combiner/up-converter circuitry via the link 305B to sample signals transmitted via the antenna 302.2.

Continuing this example, the summation circuitry 309A may also be coupled to the signals received via the link 305A via the antenna 302.1, which may include a composite signal having both signals of interest and one or more echo signals. The summation circuitry 309A functions to subtract estimated echo signals provided by the adaptive echo canceller 303A from the composite signals received via the link 305A to provide an output signal to the splitter/downconverter circuitry 306A. When the estimated echo signals substantially approximate the actual echo signals within the composite signal, the echo signals included in the composite signal are removed from the resulting signal output from the summation circuitry 309A.

Embodiments include the adaptive echo canceller circuitry 303A utilizing the signal output from the summation circuitry 309A as feedback to adaptively adjust the estimated echo signals to converge to a signal that approximates the echo signals within a threshold tolerance or value. This echo cancellation technique may be performed in accordance with any suitable type of echo cancellation algorithms, including known techniques to do so. As an example, the adaptive echo canceller circuitry 303A may periodically sample the output of the phased array radio module 304A during "silent" periods during which signals of interest are not being received via the antenna 302.1. During these silent periods, the composite signals received via the summation circuitry 309A consist mainly of the echoes, and not the signals of interest. The adaptive echo canceller circuitry 303A may therefore use the output of the summation circuitry 309A during these silent sampling periods to better estimate the echo signals.

Moreover, although referred to herein as an adaptive echo cancellation, the embodiments herein include the use of fixed echo cancellation as well. The use of fixed versus adaptive echo cancelation may be particularly useful, for instance, in fixed or controlled environments in which adaptive echo estimations are not needed.

In the above examples, the combiner and up-converter circuitry 310A up-converts the signals received from the IF circuitry 308A prior to transmission of the signals via the phased array radio module 312A and accompanying antenna 302.3, and the combiner and up-converter circuitry 310A uses the same LO signal as the splitter and down-conversion circuitry 306A to do so. These are provided as non-limiting examples, however, and although shown in FIG. 3A as sharing a common LO signal line, embodiments include each of the splitter and down-conversion circuitry 306A, 310B and/or the combiner and up-conversion circuitry 306B, 310A receiving independently generated LO signals. This may enable the frequency of the signals transmitted via the antenna 302.3 after up-conversion to be different than the frequency of signals received via the antenna 302.1. This may be extended to any suitable number of IF chains that are implemented as part of the architecture 300.

In other words, using mmWave operating frequencies as an illustrative example, by converting an original mmWave RF frequency to an appropriate IF frequency, the resulting transmitted signal may be up-converted to another frequency besides the original mmWave frequency. Continuing this example, a 28 GHz signal received via the antenna 302.1 may be down-converted to a 3 GHz signal and then up-converted from 3 GHz to a 39 GHz for transmission via the antenna 302.3. As another example, the use of different up-conversion and down-conversion frequencies may enable the relay 120 to split received signals (from the donor side, the donor/access side, or both) into two separate up-stream and down-stream bands to effectively change Time Division Duplex (TDD) to time and Frequency Division Duplex (T+F)DD. Such embodiments advantageously provide additional isolation between the up- and down-streams within each respective IF chain.

Again, the architecture 300 of the relay 120 may enable both donor-donor and donor-access modes of operation, and the relay 120 may switch between these operational modes based upon the various detected conditions as noted above. When operating in conjunction with another relay 120 in a donor-donor mode of operation (e.g., in a two or more hop scenario), the embodiments described herein provide additional advantages in that the communications between two relays 120 are transparent to the AP 104 and any served user devices 102. For instance, the AP 104 and the user devices 102 may operate in accordance with a suitable mmWave protocol, using two relays in between them to do so. In this scenario, the communications between the two relays 120 need not occur in accordance with the same mmWave frequencies used by the user device 102 and the AP 104.

For example, when two relays 120 are communicating with one another, the up-conversion step may be omitted. That is, the signal received from a user device or an AP may be down-converted and then transmitted without up-converting the signal, or the signal may be up-converted to a different frequency than the signal which was received from the AP or the user device. Thus, in a two-hop scenario, a relay 120 may communicate with another relay 120 using any suitable frequency and communication protocol, which is transparent to the AP and the user devices. This advantageously allows the relays 120 to operate using a lower frequency, which may enable less path loss and/or leverage other signal properties that are more advantageous for lower frequency signals versus higher frequency signals (e.g. less loss through walls or other materials).

Turning now to the use of the transmission medium 320A, 320B as shown in FIG. 3A, the IF circuitry 307A, 308A, 307B, and 308B may be configured in accordance with the particular transmission medium for each application of the relay 120. For instance, as shown in FIG. 2, the transmission medium may span a window or wall, with the relay 120 straddling each side of a building structure in this manner. The transmission medium may also include an open space, in some embodiments. Regardless of the particular transmission medium, embodiments include the IF circuitry 307A, 308A, 307B, and 308B being configured with appropriate circuitry and hardware components to ensure that the IF signals propagate, within each IF chain, through each transmission medium 320A, 320B.

Figure 3B:
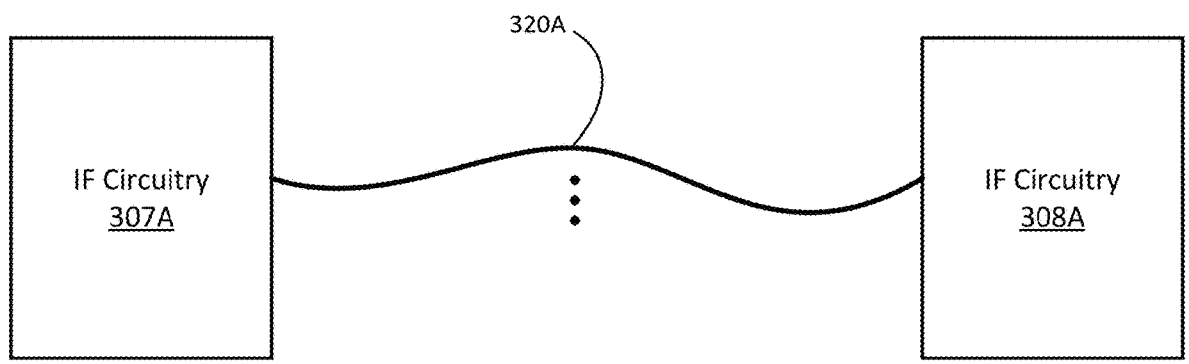
FIGS. 3B-3D are examples of the transmission medium between the IF circuitry as shown in FIG. 3A, in accordance with an embodiment of the present disclosure.
Figure 3C:
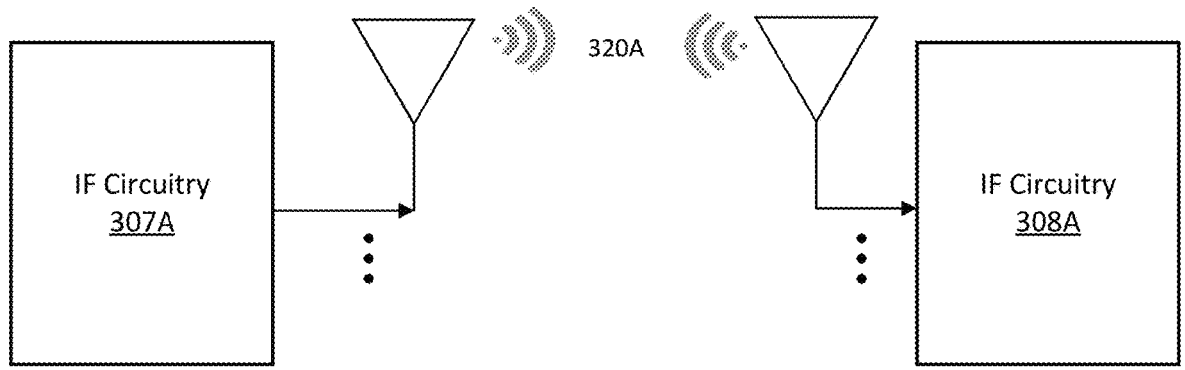
Figure 3D:
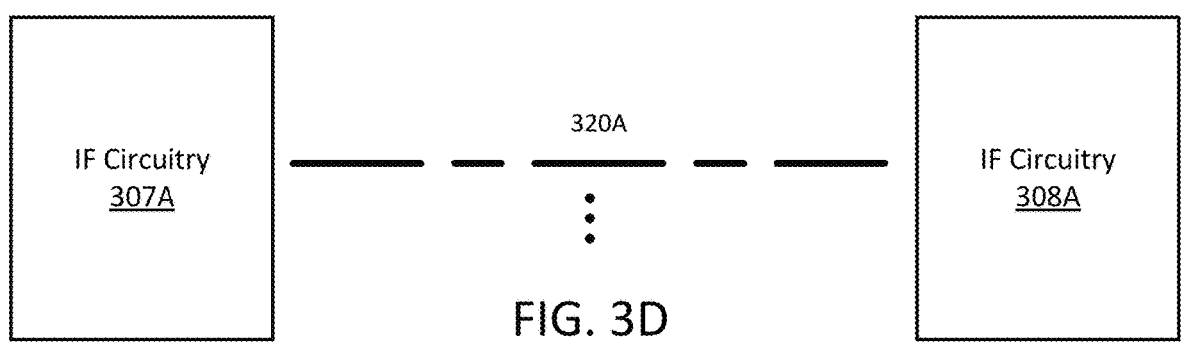

FIGS. 3B-3D are examples of the transmission medium between the IF circuitry as shown in FIG. 3A, in accordance with an embodiment of the present disclosure. Although only the IF circuitry 307A, 308A are shown in FIGS. 3B-D for purpose of brevity, the examples discussed with reference to FIGS. 3B-D may be applicable to the transmission medium formed between any two IF chains of the architecture 300 (e.g., between the IF circuitry 307B and 308B). Moreover, although a single link is shown in each of FIGS. 3B-3D for carrying signals over the different types of transmission mediums, this is by way of example and not limitation. Regardless of the particular type of transmission medium that is implemented (e.g., wireless links, optical links, cable, etc.) embodiments include the IF circuitry 307A and 308A (as well as other IF circuitry included in the architecture 300 such as IF circuitry 307B, 308B, for example) transmitting and receiving signals between one another using any suitable number and/or type of transmission mediums, which need not be the same as one another. For instance, the IF circuitry 307A and 308A may be coupled to one another via one or more cables, wireless links, optical links, etc., that are associated with each frequency band once the received signal is split into its constituent frequency bands via the splitter/downconverter circuitry 306A. As another example, the IF circuitry 307A and 308A may be coupled to one another via one or more cables, wireless links, optical links, etc., for each independent signal stream, such as each polarization feed, for instance.

FIG. 3B shows the IF circuitry 307A and 308A of FIG. 3B with additional detail for the transmission medium 320A. In this example, the transmission medium is a physical connection between the IF circuitry 307A and the IF circuitry 308A. This physical connection may include any suitable type of coupling configured to carry signals at the appropriate down-converted frequency from the IF circuitry 307A to the IF circuitry 308A. For instance, the physical connection may include a coaxial cable, a waveguide, an optical cable (e.g. fiber optic cabling), etc.

Although not shown in FIG. 3B for purposes of brevity, the IF circuitry 307A and the IF circuitry 308A may include any suitable type of components to facilitate the transmission and reception of the signals transmitted through a particular type of transmission medium 320A. For instance, if a coaxial cable or waveguide is used, the IF circuitry 307A, 308A may include tuned transmission line couplers, transformers, and/or transmission line adapters to ensure that the down-converted IF signals are appropriately coupled through the transmission medium 320A from the IF circuitry 307A to the IF circuitry 308B without excessive signal reflections. As another example, if an optical cable is used, the IF circuitry 307A may include RF to optical transducers, and the IF circuitry 308A may include optical to RF transducers to ensure that the down-converted IF signals are converted to an optical wavelength and appropriately coupled through the transmission medium 320A from the IF circuitry 307A to the IF circuitry 308B without excessive loss.

In the example shown in FIG. 3C, the transmission medium 320A is a physical separation between which the IF circuitry 307A and the IF circuitry 308A are coupled in accordance with one or more suitable wireless links (e.g., RF links). In this example, although not shown in FIG. 3C for purposes of brevity, the IF circuitry 307A and the IF circuitry 308A may include any suitable type of components to facilitate the transmission and reception of signals transmitted wirelessly. For instance, the IF circuitry 307A, 308A may include tuned transceivers (or a tuned transmitter and a tuned receiver, respectively) that are coupled to respective antennas to ensure that the down-converted IF signals are appropriately transmitted through the transmission medium 320A from the IF circuitry 307A to the IF circuitry 308B without excessive signal loss. Some signal loss is expected due to ordinary path loss associated with the wireless link between the IF circuitry 307A, 308A, although this can be compensated via the IF circuitry 308A using appropriate amplification, as discussed herein.

In the example shown in FIG. 3D, the transmission medium 320A is also a physical separation between which the IF circuitry 307A and the IF circuitry 308A are coupled, but the link in this example is facilitated via optical data transmission instead of the RF link as shown in FIG. 3C. Again, although not shown in FIG. 3D for purposes of brevity, the IF circuitry 307A and the IF circuitry 308A may include any suitable type of components to facilitate the transmission and reception of optical signals transmitted via the transmission medium 320A. For instance, the IF circuitry 307A may include RF to optical transducers, and the IF circuitry 308A may include optical to RF transducers to ensure that the down-converted IF signals are converted to an optical wavelength and appropriately coupled through the transmission medium 320A from the IF circuitry 307A to the IF circuitry 308B without excessive loss.

The use of optical bands as the transmission medium may be particularly useful, for instance, when the relay 120 is implemented as part of a distributed or in-building wireless solution. Although the embodiments described herein are not limited to the use of optical bands and may encompass the use of any of the aforementioned transmission mediums, the use of optical bands allows for flexible, small, and low cost optical fiber and splitters to be used for such implementations. An example of a distribution network in the IF domain using optical bands in the transmission medium is shown in FIG. 3E and further discussed herein, in accordance with an embodiment of the present disclosure.

Figure 3E:
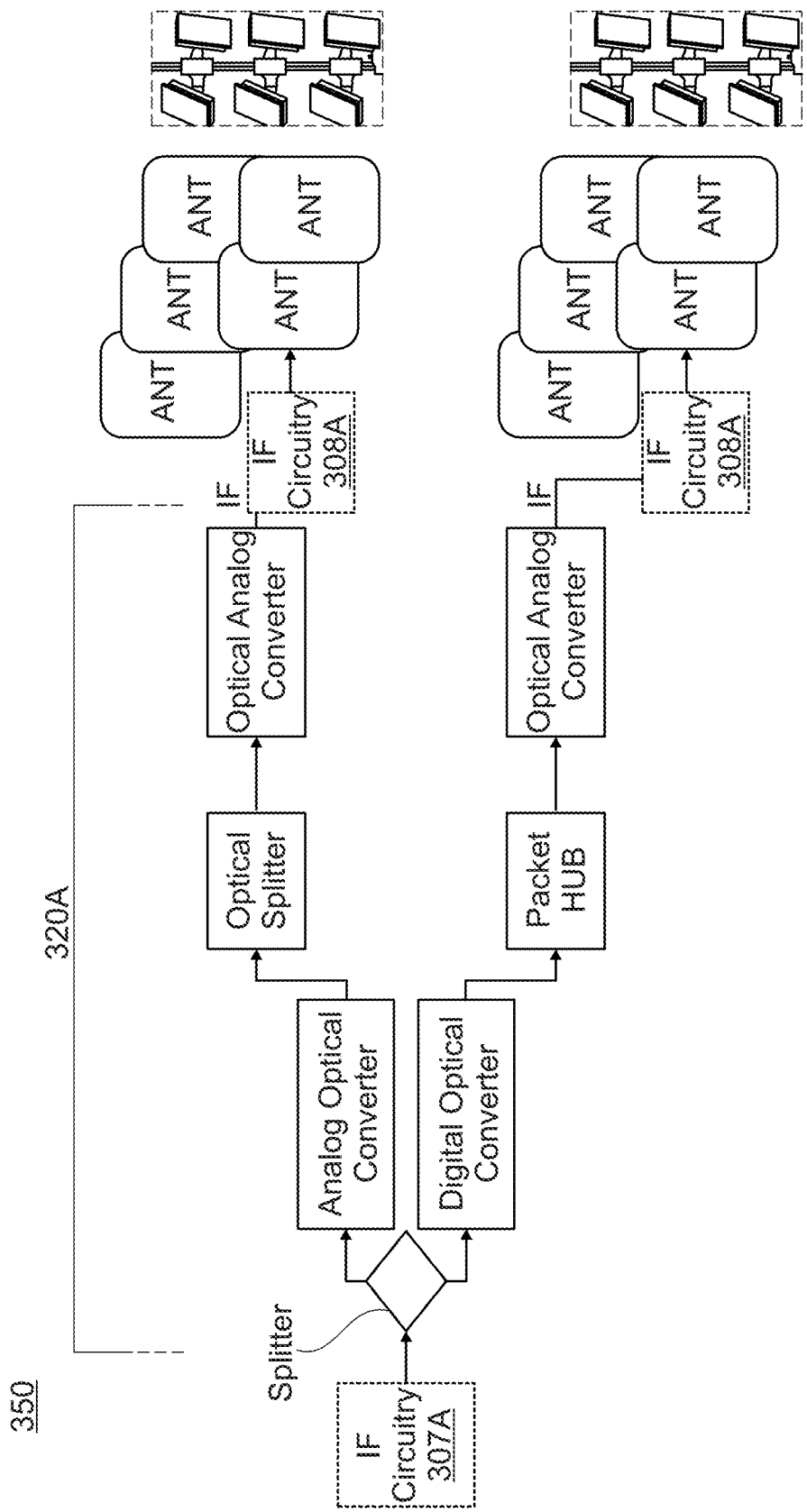
FIG. 3E is an example of a distribution network in the IF domain as a transmission medium, in accordance with an embodiment of the present disclosure.

As shown in FIG. 3E, the transmission medium 320A may include in this example a portion or an entire distributed network that is implemented within each side of the IF circuitry 307A, 308A. Again, the embodiments described herein are not limited to the example of two IF chains as shown in FIG. 3A. Additionally, the embodiments as described herein are not limited to a 1:1 relationship between the IF circuitry 307A, 308A and/or the IF circuitry 307B, 308B. For example, a donor/access side IF chain may include the IF circuitry 308A coupled to the combiner and up-converter circuitry 310A, the phased array radio module 312A, and the antennas 302.3. Embodiments include the architecture 300 including any suitable number of donor/access side IF chains coupled to the IF circuitry 307A via the transmission medium 320A.

As an illustrative example, the in-building network 350 may include a relay 120 with the IF circuitry 307A associated with the donor side, which may communicate with a suitable donor such as an AP (not shown). The down-converted IF signal provided by the IF circuitry 307A may be of any suitable type as discussed herein, such as an optical transmission. The transmission medium 320A may be implemented as an installed distributed network, and may utilize the down-converted signal provided by the IF circuitry 307A. The distributed network may distribute the down-converted signal provided by the IF circuitry 307A in various ways as shown in FIG. 3E, which may include any suitable number of splitters, analog optical converters (e.g. RF to optical transducers), digital optical converters (e.g. RF to optical transducers), optical splitters, packet hubs, optical analog converters (e.g. optical to RF transducers), etc.

Regardless of the manner in which the downconverted signal is distributed in the in-building network 350, each IF circuitry 308A may ultimately receive the downconverted signal in the IF domain and then amplify, filter, echo cancel, etc., the signals, which are then passed along the remainder of the access/donor chain to the accompanying antennas as shown in FIG. 3E. In this way, the embodiments described herein advantageously facilitate the use of signal distribution in the IF domain.

Again, in an embodiment, the antennas 302.1, 302.2, 302.3, and 302.4 may be formed as part of a phased antenna array. When part of a phased antenna array, the antennas 302.1, 302.2, 302.3, and 302.4 may transmit and receive data, as the case may be, in accordance with a beamforming pattern using any suitable type of beamforming technique. In doing so, each of the antennas 302.1, 302.2, 302.3, and 302.4 may have a high isolation between them, and may also be highly directive. Advantageously, the high directivity further improves the isolation between antennas, and thus IF circuitry 307A, 308A, 307B, and/or 308B need not implement the echo cancellation functionality in some cases.

Furthermore, the antennas 302.1, 302.2, 302.3, and 302.4 may be implemented as any suitable type of antenna that may facilitate wireless data transmission and/or reception in accordance with the communications protocols used by the relay implementing the architecture 300 (e.g., relay 120). For example, the antennas 302.1, 302.2, 302.3, and 302.4 may be implemented as individual antennas (e.g. single elements) or as antenna arrays. When implemented as a phased antenna array, the individual elements of the phased antenna arrays may likewise be implemented as any suitable type of antenna. Some non-limiting examples of suitable antennas (or elements of the phased antenna arrays) include dipole antennas, folded dipole antennas, patch antennas, multiple-input multiple-output (MIMO) antennas, omnidirectional antennas, pseudo- or quasi-omnidirectional antennas, or the like.

With further regards to pseudo- or quasi-omnidirectional antennas, embodiments include the architecture 300 implementing such pseudo- or quasi-omnidirectional antennas as multiple elements, which may be oriented in a specific pattern and may include internally integrated combiners to feed transmit RF to, and derive receive RF signals from, individual antenna elements. This may enable common antenna ports to service an area associated with azimuth pattern surrounding the antenna. When pseudo- or quasi-omnidirectional antennas are implemented, the antenna elements may be tuned or optimized within multiple bands for a particular application so that gain, downtilt and vertical (elevation) and horizontal (azimuth) beamwidths are all optimized to meet specific requirements. When implemented, pseudo- or quasi-omnidirectional antennas also advantageously provide cross polar (e.g. dual slant+/−45°) polarization, so each set of 2×2 radio feeds benefits from polarization diversity, and hence diversity gain.

Figure 5B:
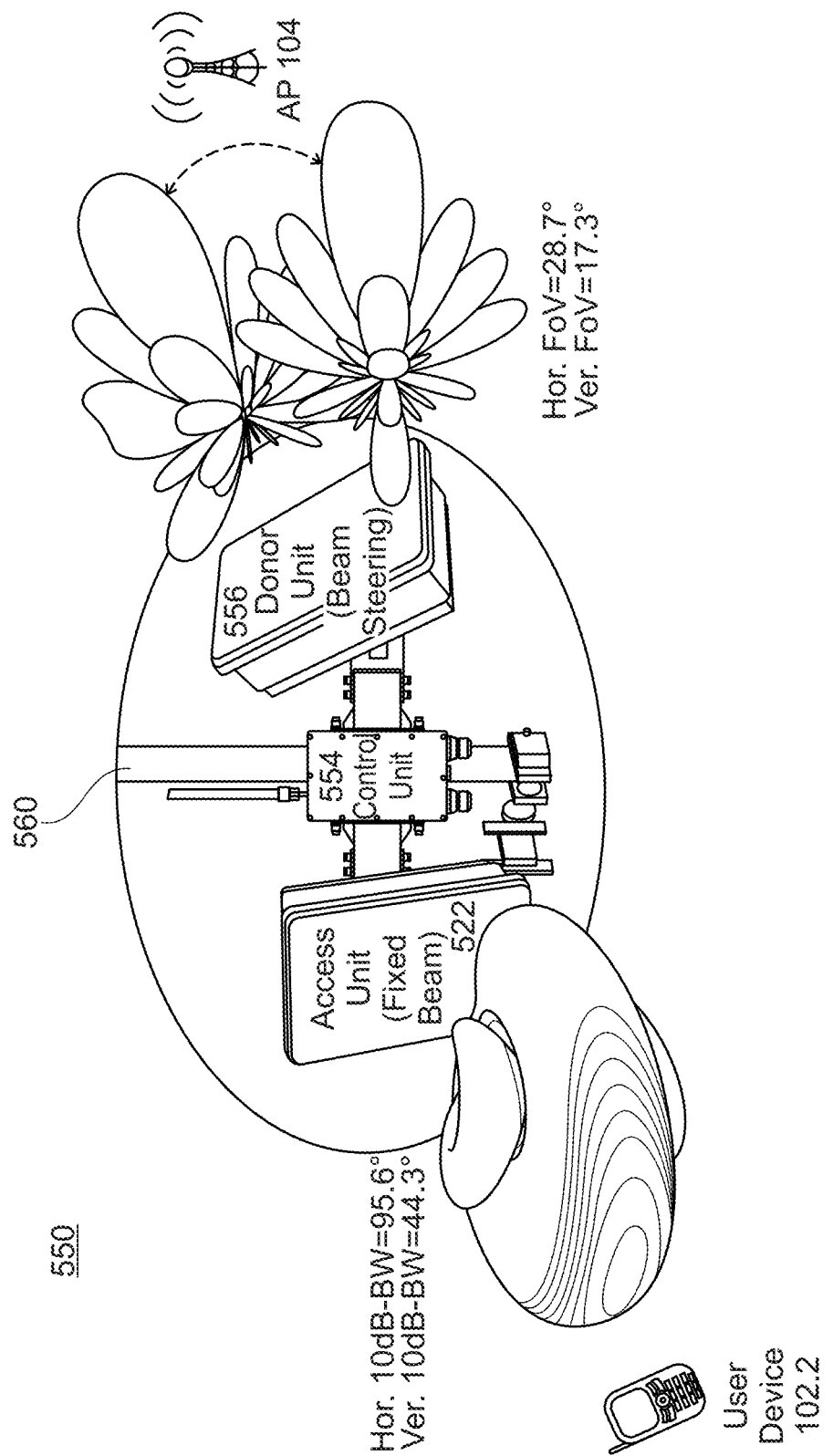
FIG. 5B depicts another example relay implementation, in accordance with an embodiment of the present disclosure.

Moreover, the operation of the antennas 302.1, 302.2, 302.3, 302.4 may be controlled via beamforming techniques as discussed herein to yield a pseudo- or quasi-omnidirectional operation. For example, it may be beneficial for the donor/access side of the architecture 300 to operate the antennas 302.3, 302.4 in accordance with a relatively wide beamwidth to ensure a larger area of coverage when operating in an access mode of operation, thus servicing a wide area of several user devices as shown in FIG. 5B. Continuing this example, it may be beneficial for the donor side of the architecture 300 (or the donor/access side) to operate the antennas 302.1, 302.2 (or 302.3, 302.4) in accordance with a relatively narrow beamwidth to ensure a higher gain when operating in a donor mode of operation as shown in FIG. 5B.

As discussed above with reference to FIG. 2, each of the phased array radio modules 304A, 312A, 304B, 312B may be configured to independently and electronically control each respectively coupled antenna 302.1, 302.2, 302.3, 302.4. This control may include the use of digital control signals supplied by the FPGA 318, as shown in FIG. 3A, as well as the use of other control signals form one or more processing components not shown in FIG. 3A for purposes of brevity. In this way, each of the each of the phased array radio modules 304A, 312A, 304B, 312B may be configured to independently and electronically control each respectively coupled antenna 302.1, 302.2, 302.3, 302.4 to cause signals received and transmitted using one or more of beamforming, beamsteering, and/or tracking techniques. Again, the particular beamforming, beamsteering, and/or tracking technique that may be implemented by each phased array radio module 304A, 312A, 304B, 312B may be dynamically changed based upon the current mode of operation of the relay 120 (i.e. in a donor to donor or a donor to access mode) as discussed above with reference to FIG. 2.

For example, although the example architecture 300 as shown in FIG. 3A indicates a donor side and a donor/access side, these sides are not fixed with regards to their designated operational modes. That is, embodiments include either the left or the right side of the architecture 300 operating in either a donor mode of operation or an access mode of operation, depending upon the particular application, detected conditions, etc. As an illustrative example, after an initial operation, the left side of the example architecture 300 may switch from a donor mode to an access mode, and the right side may begin in an access mode or a donor mode of operation and then dynamically switch to another mode of operation as needed.

Although the example architecture 300 illustrates a total of 4 antennas (which again may include individual antennas or respective phased antenna arrays), other embodiments of the example architecture 300 include additional antennas, which may have different polarizations, such as when the antennas 302.1, 302.3, 302.3, 302.4 are implemented as pseudo- or quasi-omnidirectional antennas, for example. To provide an illustrative example, each of the antennas 302.1, 302.3, 302.3, 302.4 as shown in FIG. 3A may be part of separate antenna arrays, which each include both a horizontally-polarized antenna array (e.g. a horizontally-polarized beam pattern formed via the appropriate combination of antenna array elements) and a vertically-polarized antenna array (e.g. a vertically-polarized beam pattern formed via the appropriate combination of antenna array elements) for a total of 8 antenna arrays.

In other words, the example architecture 300 as shown in FIG. 3A illustrates a specific use case of a single polarization per each of the antennas 302.1, 302.3, 302.3, 302.4. However, this is by way of example and not limitation, and the example architecture 300 is illustrated in this manner for clarity and ease of explanation. Embodiments include each of the antennas 302.1, 302.3, 302.3, 302.4 being one of two antennas (or antenna arrays) that form part of a dual polarity feed configuration. In accordance with such embodiments, each of the components shown in FIG. 3A that are coupled between the antennas 302.1 and 302.3 (and thus constitute one IF chain) as well as the components that are coupled between the antennas 302.2 and 302.4 (which constitute another IF chain) may be duplicated. That is, the top IF chain may constitute two IF chains in this example, each being coupled to a different respective antenna having a different polarization (e.g., 302.1-H and 302.1-V and 302.3-H and 302.3-V). Likewise, the bottom IF chain may constitute two IF chains in this example, each being coupled to a different respective antenna having a different polarization (e.g., 302.2-H and 302.2-V and 302.4-H and 302.4-V). Thus, embodiments include the architecture 300 operating in accordance with independent IF chains for each antenna polarization. Of course, separate antennas (or antenna arrays) 302.12, 302.2, 302.3, 302.4 need not be required to utilize separate horizontal and vertical polarization feeds. For example, one or more of the antennas 302.1, 302.3, 302.3, 302.4 may instead include antenna elements configured with separate horizontal and vertical feeds shared among the same physical antennas, and these feeds may thus be coupled to separate IF chains as discussed above in a similar manner as is done for separate physical antennas.

Continuing this example of using separate polarization streams, in addition to the isolation provided via the high directivity of each of the antennas, the donor side antennas (302.1-H, 302.1-V, 302.2-H, 302.2-V) and the donor/access side antennas (302.3-H, 302.3-V, 302.4-H, 302.4-V) may be placed in different positions with respect to one another to ensure that a proper isolation level is achieved. This placement may be dependent, for instance, on different relative positions of the serving AP and a particular "shadowed" area that needs to be served by the distributed relay in which the example architecture 300 is implemented.

Figure 4A:
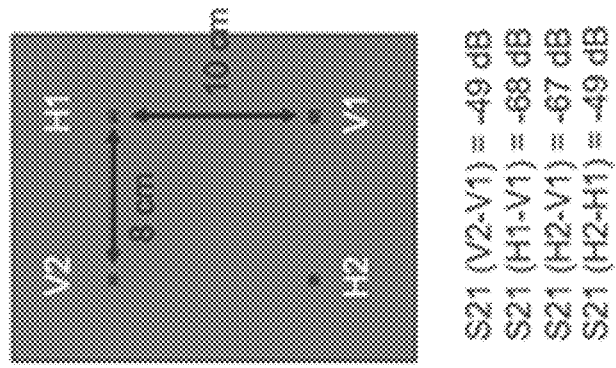
FIG. 4A depicts a first example antenna placement, in accordance with an embodiment of the present disclosure.
Figure 4A:
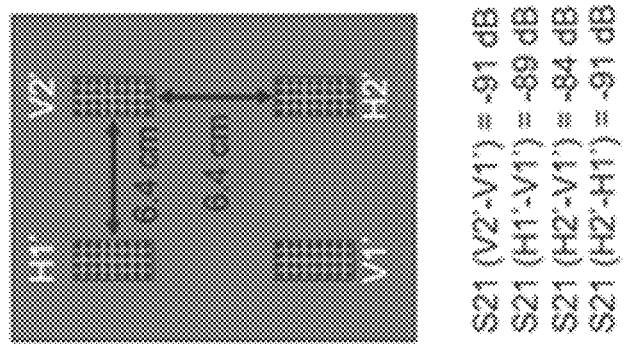
Figure 4A:
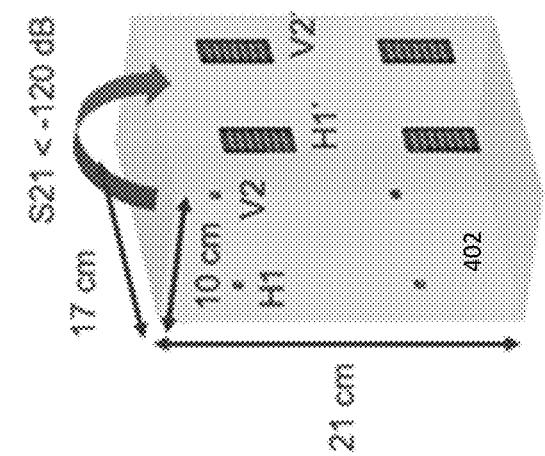
Figure 4B:
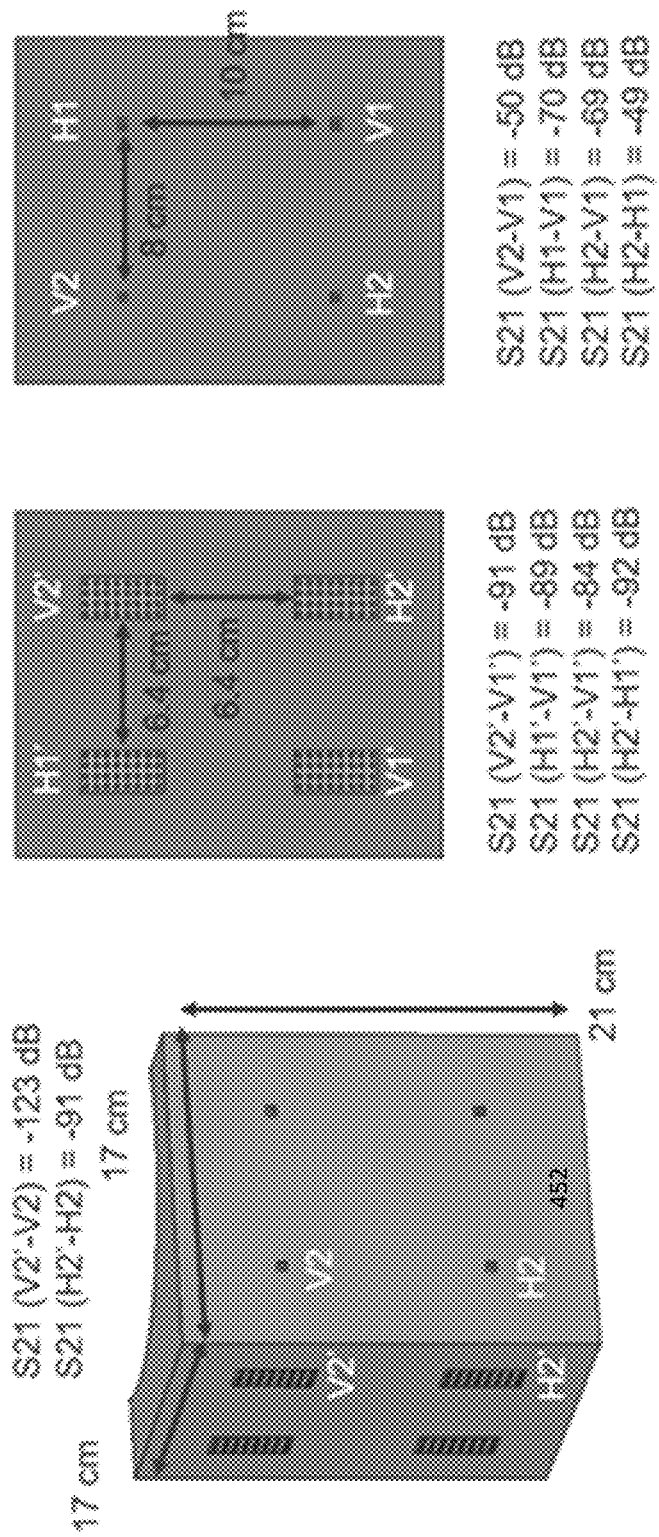
FIG. 4B depicts a second example antenna placement, in accordance with an embodiment of the present disclosure.

In various embodiments, the relay 120 may be formed with a housing that includes any suitable shape. As one example, the relay 120 may be formed in a housing having a rectangular shape as shown in FIGS. 4A-4B, which includes 6 sides formed at 90 degree angles with respect to one another. Continuing the above example, the antennas may be placed on opposite sides of the device housing 402 as shown in FIG. 4A, positioned at 180° with respect to one another. The notation shown in FIG. 4A may represent the four donor side antennas 302.1-H, 302.1-V, 302.2-H, 302.2-V as H1, V1, H2, V2, respectively, whereas the donor/access side antennas 302.3-H, 302.3-V, 302.4-H, 302.4-V may be represented as H1', V1', H2', V2', respectively. As another example, the antennas may be placed on adjacent sides of the device housing 452, as shown in FIG. 4B, positioned at 90° with respect to one another. The notation shown in FIG. 4B may represent the four donor side antennas 302.1-H, 302.1-V, 302.2-H, 302.2-V and the donor/access side antennas 302.3-H, 302.3-V, 302.4-H, 302.4-V using the same representation as that of FIG. 4A.

Continuing this example, the isolation parameter (S21) was evaluated via electromagnetic (EM) simulation software between the antenna elements as shown in FIGS. 4 and 5, with the results of the evaluation being presented corresponding to each relay form-factor design. From an analysis of the simulation data, it can be seen that antennas have a minimum isolation of about −50 dB (e.g. −49 dB as shown), which allows the relay 120 to have a signal amplification of up to 40 dB (e.g., the target amplification value discussed herein), leaving the remainder (10 dB) to address the fast signal decaying issues and to prevent feedback resonance issues.

In some embodiments, dielectric lenses of any suitable design (e.g., an elliptic dielectric lens or Fresnel lenses) may be applied to the donor side antennas 302.1, 302.2 and/or to the donor/access side antennas 302.3, 302.4 to further increase their respective gains. To evaluate the efficiency of the distributed relays as discussed herein, several simulation scenarios were considered and modeled and tested, as further discussed below.

Moreover, as discussed above with reference to FIG. 2, each of the phased array radio modules 304A, 312A, 304B, 312B may be configured to independently and electronically control each respectively coupled antenna 302.1, 302.2, 302.3, 302.4. This control may include the use of digital control signals supplied by the FPGA 318, as shown in FIG. 3A, as well as the use of other control signals form one or more processing components not shown in FIG. 3A for purposes of brevity. In this way, each of the each of the phased array radio modules 304A, 312A, 304B, 312B may be configured to independently and electronically control each respectively coupled antenna 302.1, 302.2, 302.3, 302.4 to cause signals received and transmitted using one or more of beamforming, beamsteering, and/or tracking techniques. Again, the particular beamforming, beamsteering, and/or tracking technique that may be implemented by each phased array radio module 304A, 312A, 304B, 312B may be dynamically changed based upon the current mode of operation of the relay 120 (i.e. in a donor to donor or a donor to access mode) as discussed above with reference to FIG. 2.

FIG. 5A depicts one example relay implementation, in accordance with an embodiment of the present disclosure. Again, the relays depicted in FIGS. 4A-4B, FIG. 6, and elsewhere herein are by way of example and not limitation. The example relay embodiments discussed throughout this disclosure may have any suitable size and/or shape depending upon the particular application or market. For instance, FIG. 5A illustrates an example of the relay 120 implemented as part of a housing 502 having dimensions of approximately 9 cm by 18 cm.

Although not shown in FIG. 5A for purposes of brevity, the antennas implemented by the relay 120 using the housing may be phased array antennas as discussed herein, and may be disposed in any suitable manner with respect to one another. To provide an illustrative example, the antennas may include the dual-polarization phased array antennas as shown and discussed with reference to FIGS. 4A-4B, which may be disposed on different sides of the housing 502 to ensure adequate isolation between each of the antennas during operation of the relay 120.

FIG. 5B depicts another example relay implementation, in accordance with an embodiment of the present disclosure. As shown in FIG. 5B, embodiments include the relay 120, which is represented as the relay 550 in FIG. 5B, including separate panels for each operating "side" of the relay 120. For instance, with reference to FIG. 3A, the access panel 552 may implement the antennas 302.3, 302.4 and accompanying components associated with the top and bottom IF chains for the donor/access side. Continuing this example, the donor panel 556 may implement the antennas 302.1, 302.2 and accompanying components associated with the top and bottom IF chains for the donor side. The central control unit 554 may include, for example, the FPGA 318 or other suitable control components such as processor circuitry, for example.

The control unit 554 may be communicatively coupled to the components (e.g. phased array radio modules) housed with each of the access panel 552 and the donor panel 556. As shown in FIG. 5B, the relay 120 may use beamsteering at the donor panel 556 to facilitate transmitting and receiving data from the AP 104. The use of electronic beamsteering obviates the need to perform high accuracy beam alignment between the donor panel 556 and the AP 104, although the donor panel 556 may be mounted to the pole 560 such that beamsteering allows a suitable link to be formed between the donor panel 556 and the AP 104 as shown in FIG. 5B. Furthermore, the access panel 552 is shown facilitating communications with a user device 102.2 using a "fixed beam." Again, embodiments include the components associated with the access panel 552 being capable of performing the same types of beamsteering, beamforming, and tracking as the components associated with the donor panel 556. However, in the example application shown in FIG. 5B, the access panel 552 utilizes a shaped beam having a fixed beam in a particular instant in time, which may be dynamically adjusted as changes in certain conditions are detected, as noted herein.

An outdoor scenario was tested operating at a frequency of 28 GHz. This included two different tests. The first of these was a street corner scenario with a UE located at a side street without LOS to the base station. For the second of these scenarios, the UE was located in a street environment with multiple obstacles, which corresponds to a typical city environment with buses, trees, billboards, etc.

An indoor scenario was also tested using a 60 GHz frequency for a VR playground in which UHD data was streaming to users in the room without interruptions. For this indoor scenario, the signal to noise ratio (SNR) per UE was evaluated to access the coverage improvement and optimize relay parameters and placements. The relay link was explicitly modeled, and the signal at the UE is a composition of direct and reflected signals from the base station (e.g., AP 104) and signals from all relays. A summary of the simulation parameters are shown in Table 1 below.

TABLE 1

| | Outdoor: Street corner, Street with obstacles | Indoor: VR playground |
|---|---|---|
| Carrier frequency | 28 GHZ | 60 GHz |
| Bandwidth | 400 MHZ | 2 GHZ |
| Base station TX power | 30 dBm (gNB) | 10 dBm (mmWave AP) |
| BS antenna | 4x8 steerable array | 2x8 steerable array |
| BS antenna gain | 20 dBi | 17 dBi |
| BS antenna height | 10 m | 3 m |
| Relay Backhaul antenna | 4x8 array + lens | 2x8 array + lens |
| Relay Backhaul antenna gain | 30 dBi | 27 dBi |
| Relay height | 4 m | 3 m |
| distributed relay Access antenna | Patch antenna, HPBW[az, el] = [80°, 40°] | Patch antenna, HPBW[az, el] = [80°, 40°] |
| distributed relay Access antenna gain | 10 dBi | 10 dBi |
| Nominal Relay amplification | 40 dB | 40 dB |
| Maximum Relay TX power | 20 dBm | 10 dBm |
| UE antenna | Dual-pol Omni, 0 dB | Dual-pol Omni, 0 dB |

Figure 6:
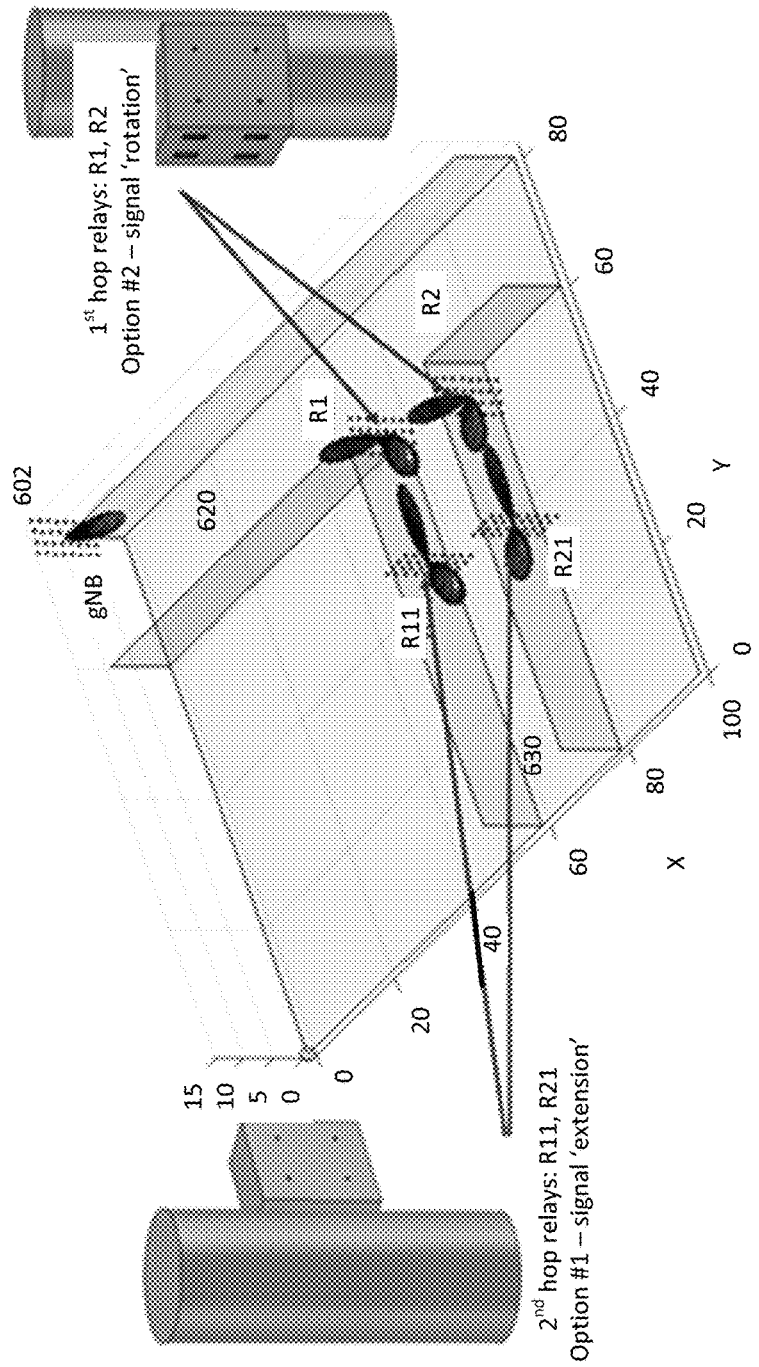
FIG. 6 is an example implementation of a 3D scenario model used in accordance with an outdoor street corner simulation, in accordance with an embodiment of the present disclosure.

The outdoor street corner scenario is illustrated in further detail in FIG. 6. The scenario 600 shows a main street 620 being covered by an AP (e.g., AP 104), which is a gNodeB 602 in this example, operating in accordance with a 28 GHz frequency band and a side street 630 without coverage. Relays R1, R2, R11, and R21, which may be implemented as the relay 120 as discussed herein, are used to serve the area behind a corner at the intersection of the main street 620 and the side street 630. These relays are further analyzed in accordance with their 1st and 2nd hop properties. An example of one of the relays R1, R2 is shown in further detail as mounted to a pole on the right in FIG. 6, whereas an example of one of the relays R11, R21 is shown in further detail as mounted to a pole on the left in FIG. 6. Again, this is only an example of an implementation of the relay 120 as discussed herein for ease of explanation and not by way of limitation. The relays R1, R2, R11, R21 may have any suitable size and shape, such as the relays shown and discussed herein with reference to FIGS. 4A-4B and FIGS. 5A-5B, for example.

Figures 7A, 7B:
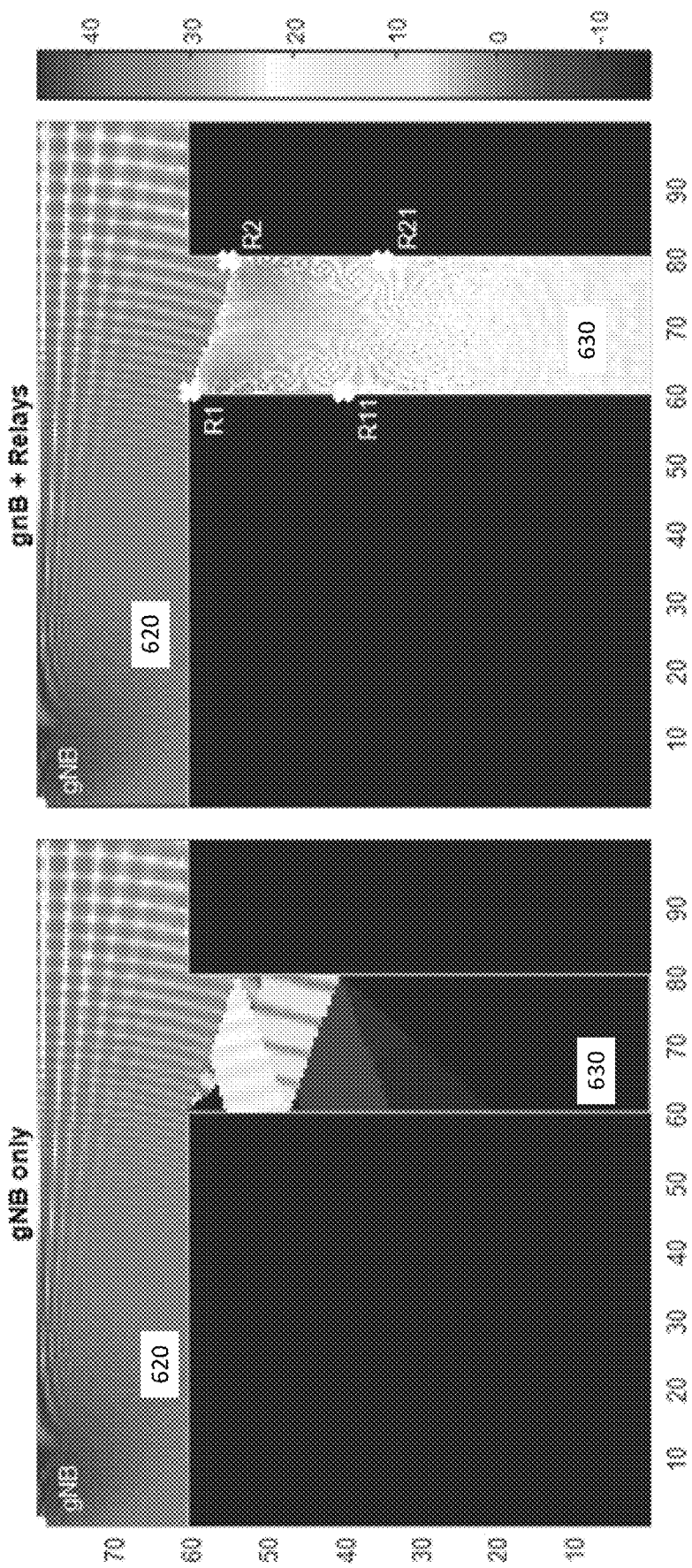
FIGS. 7A-7C illustrate a comparison of SNR for various cases in accordance with the scenario model as shown in FIG. 6, in accordance with an embodiment of the present disclosure.
Figure 7C:
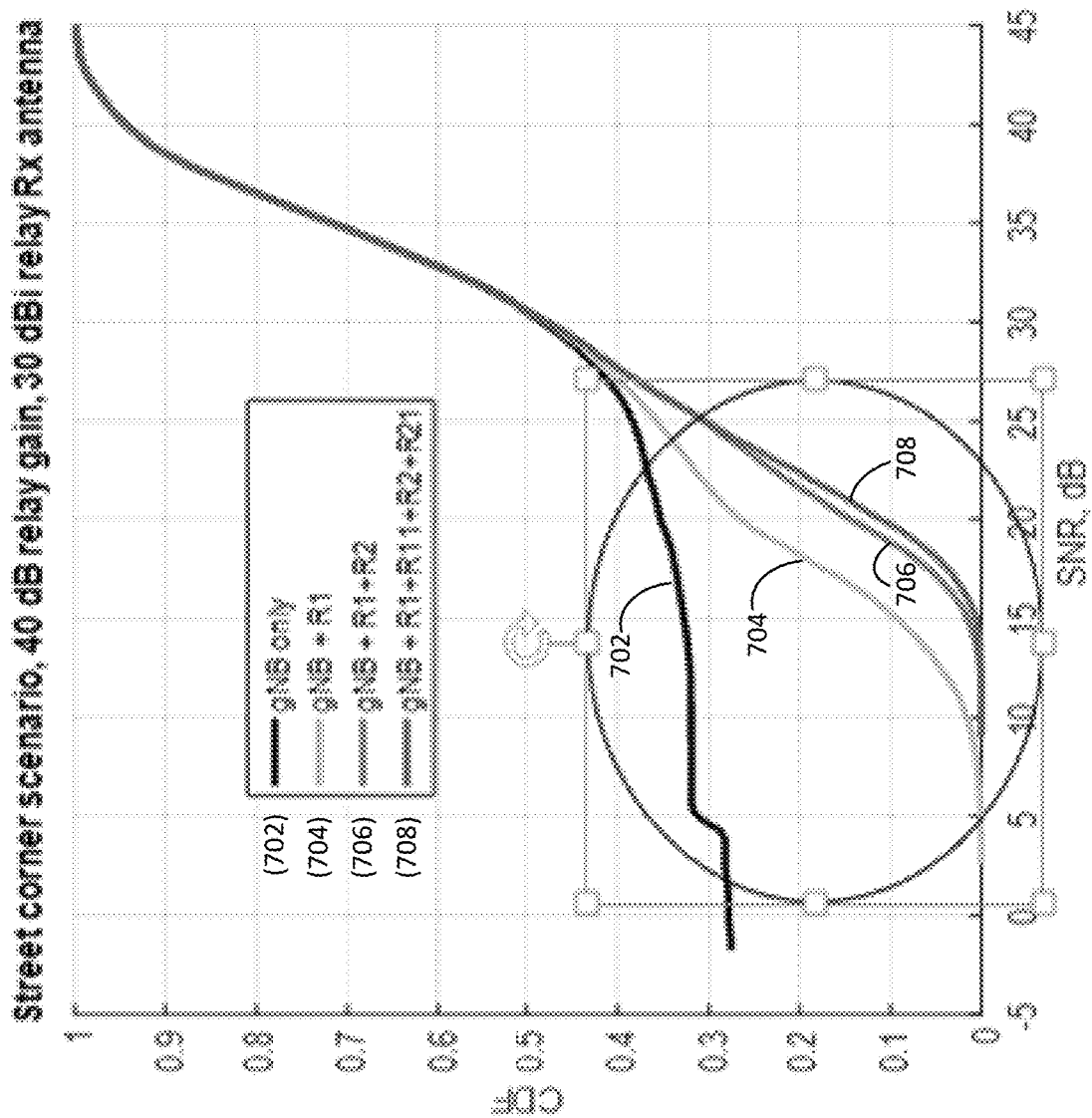

The implementation of the 3D scenario model used in accordance with the simulation is represented in FIG. 6, while the SNR comparison for the cases with and without relays are shown in further detail in FIGS. 7A-7C. From FIGS. 7A-7B, it can be seen that placement of the one-hop relays R1, R2 as shown in FIG. 6 allows for full coverage of the area behind the street corner, and increasing the number of one-hop relays may improve the SNR. However, the SNR cumulative distribution function (CDF) analysis shows the inefficiency of 2nd hop relays R11, R21. In particular, the path loss is too large to be compensated at larger hop distances, but a closer proximity to the one-hop relay R1 results in a good SNR, as indicated by the color-coded legend as shown in decibels. This is further indicated in the circled region of FIG. 7C, which plots the CDF versus the SNR in dB.

Figure 8:
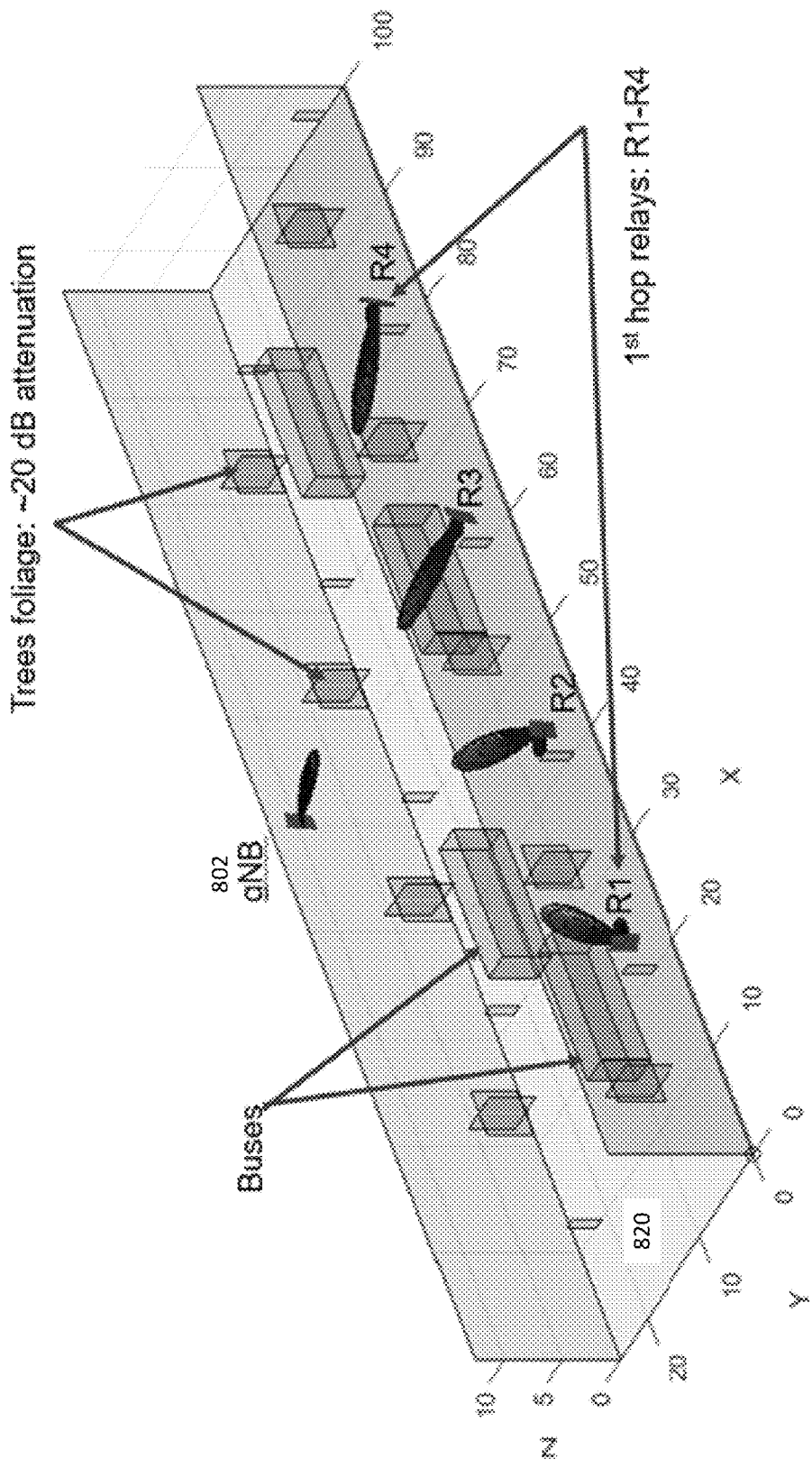
FIG. 8 is an example implementation of a 3D scenario model used in accordance with an outdoor street with obstacles simulation, in accordance with an embodiment of the present disclosure.

The street with obstacles scenario as discussed above was also simulated, with the implementation of the 3D scenario model in the simulator as shown in FIG. 8. As shown in FIG. 8, the scenario 800 resembles the typical urban environment with intensive bus traffic, trees, and billboards. An AP, which is a gNB 802 in this example, is implemented with a steerable antenna array that covers most of the street 820. However, relays R1, R2, R3, and R4, which may be implemented as the relay 120 as discussed herein, are positioned on the opposite side of the gNB 802 and may help to supplement the coverage area of the gNB 802.

Figure 9C:
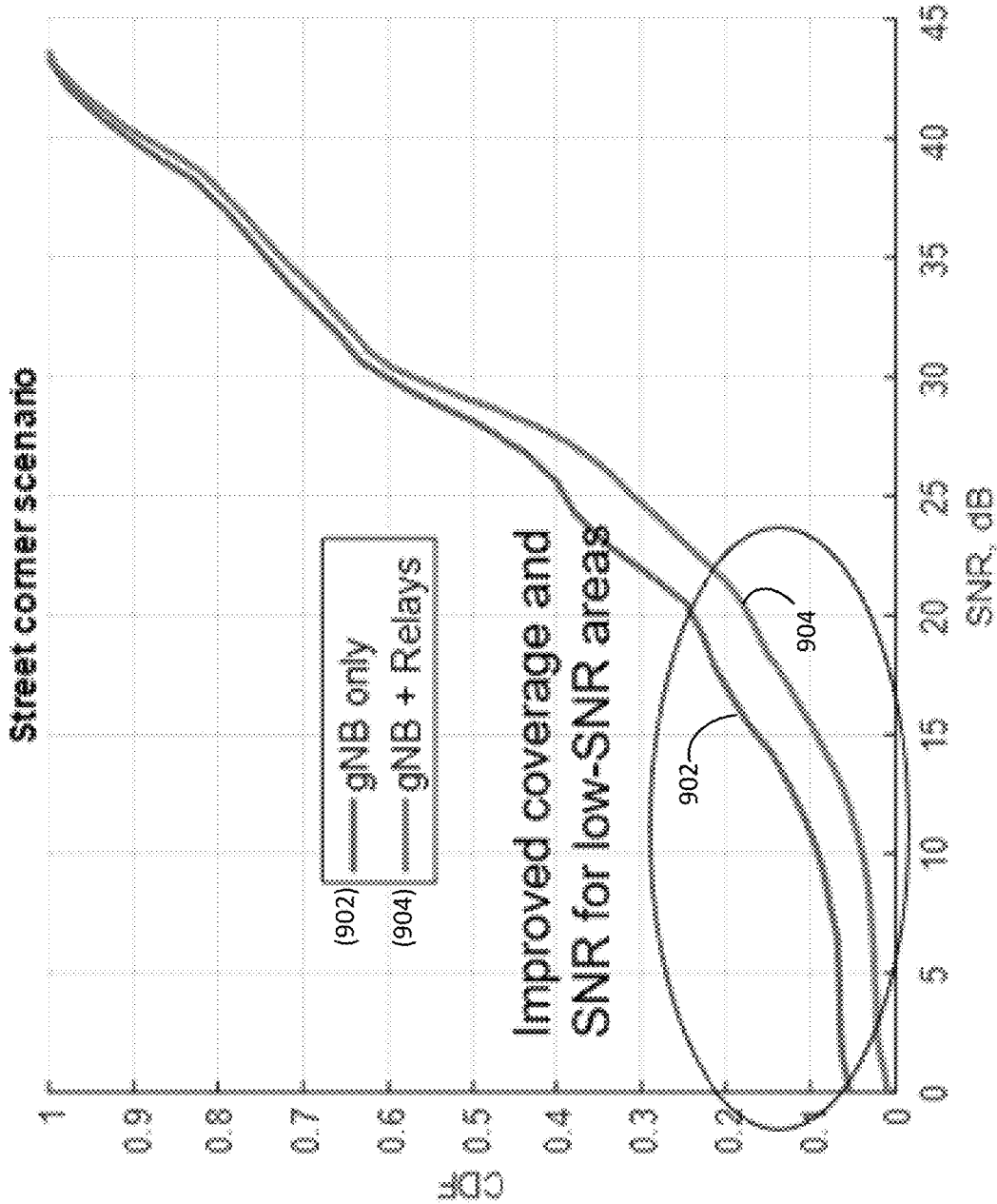

The SNR comparison for cases with and without the relays R1, R2, R3, and R4 is shown in FIGS. 9A-9C. As shown by comparing FIGS. 9A-9B, it is observed that the presence of the relays R1, R2, R3, and R4 fills in the coverage gaps in the street 820, as indicated by the color-coded legend as shown in decibels. This is again indicated in the circled region of FIG. 9C, which plots the CDF versus the SNR in dB for both the use of only the gNB (902) and for the gNB in addition to the relays R1, R2, R3, and R4 (904).

Figure 10:
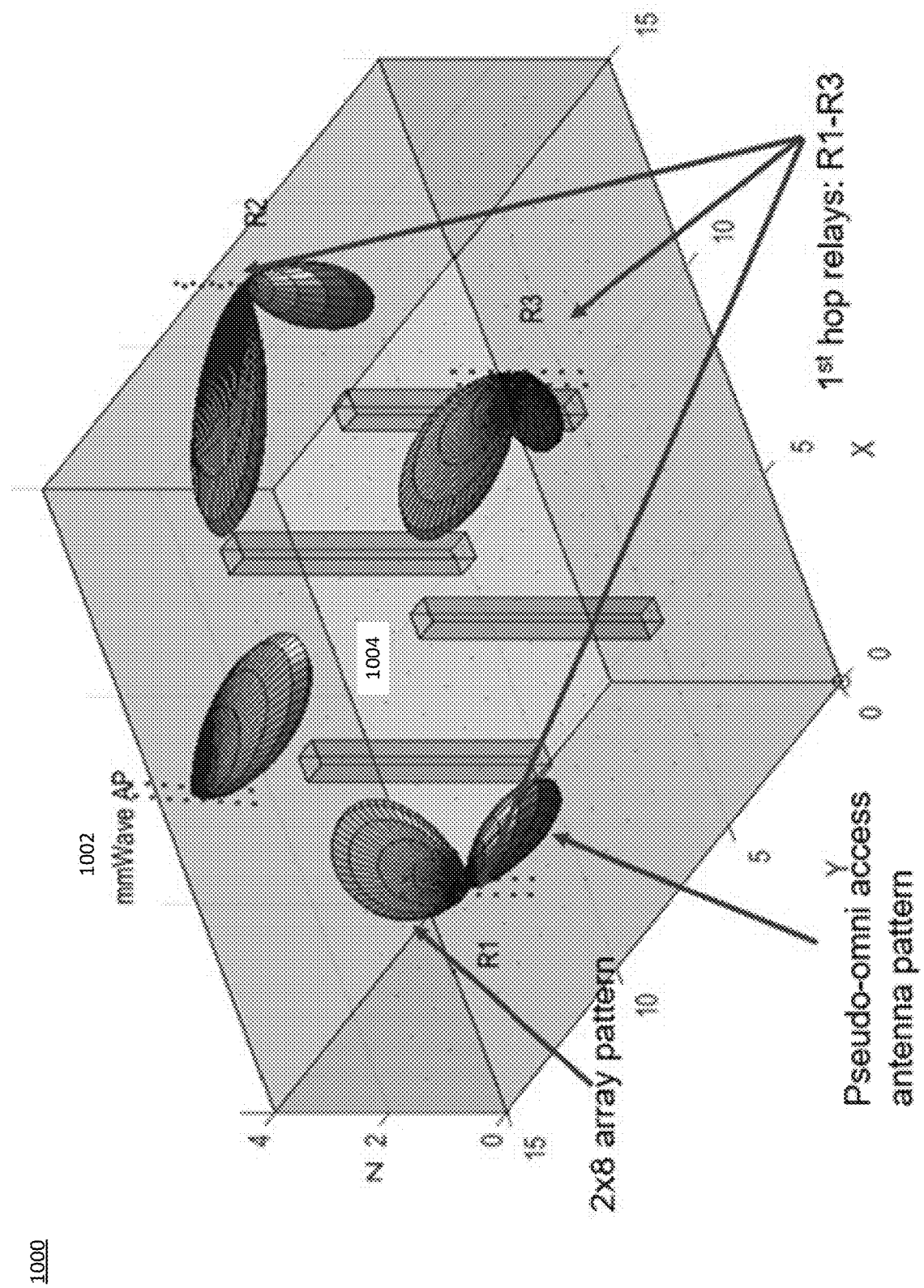
FIG. 10 is an example implementation of a 3D scenario model used in accordance with a VR playground, in accordance with an embodiment of the present disclosure.

The VR playground scenario as discussed above was also simulated in accordance with a ray-tracing simulator using a 3D scenario model as shown in FIG. 10. As shown in FIG. 10, the 3D scenario model 1000 is a 3D reconstruction of real VR playground 1004 (Anvio VR, Moscow). Relays R1, R2, and R3, which may be implemented as the relay 120 as discussed herein, are used to enhance the SNR and cover shadow areas. As shown in Table 1 above, the mmWave AP 1002 operates in accordance with a 60 GHz carrier with a 2 GHz bandwidth, unlike in the previous outdoor scenarios.

Figures 11A, 11B:
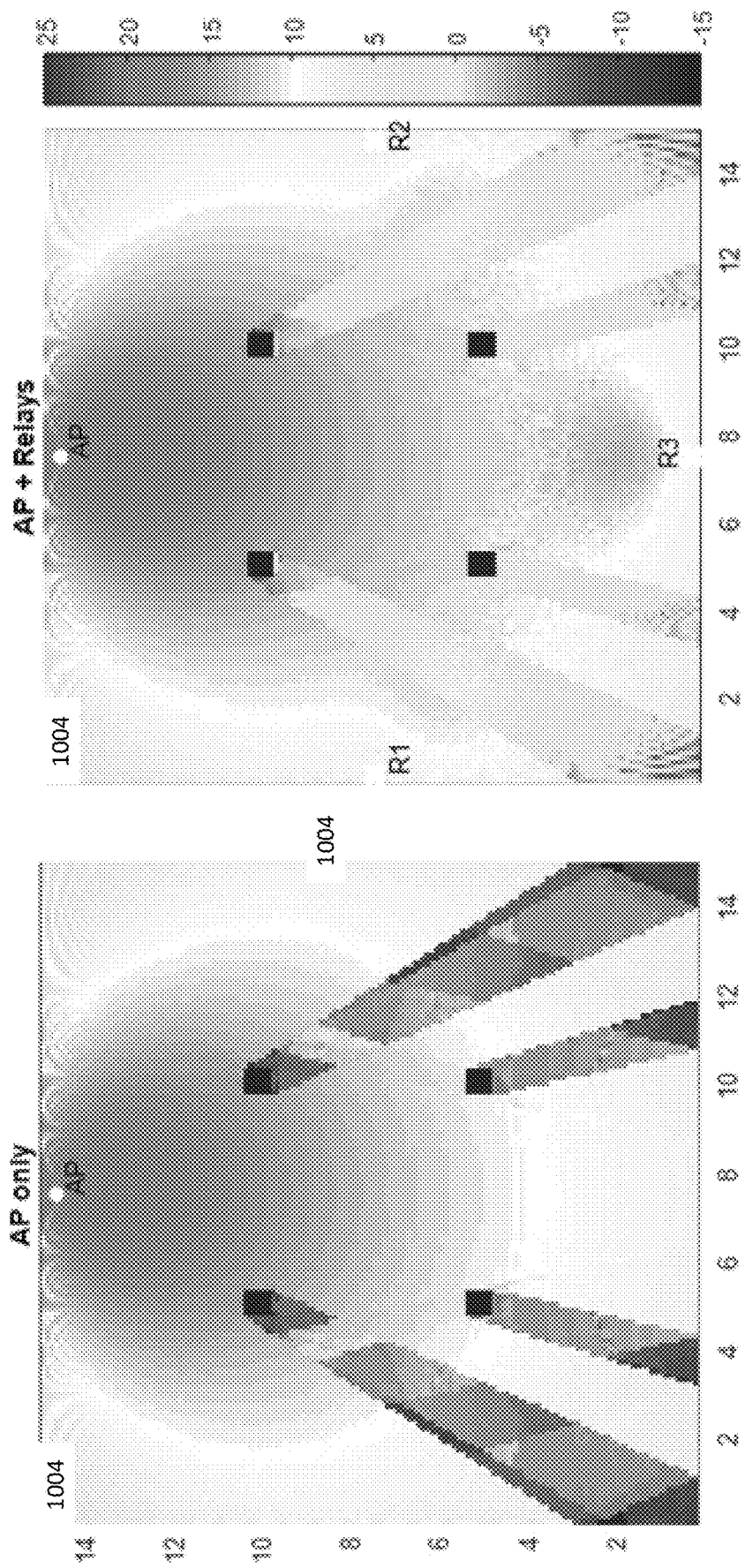
FIGS. 11A-11C illustrate a comparison of SNR for various cases in accordance with the scenario model as shown in FIG. 10, in accordance with an embodiment of the present disclosure.
Figure 11C:
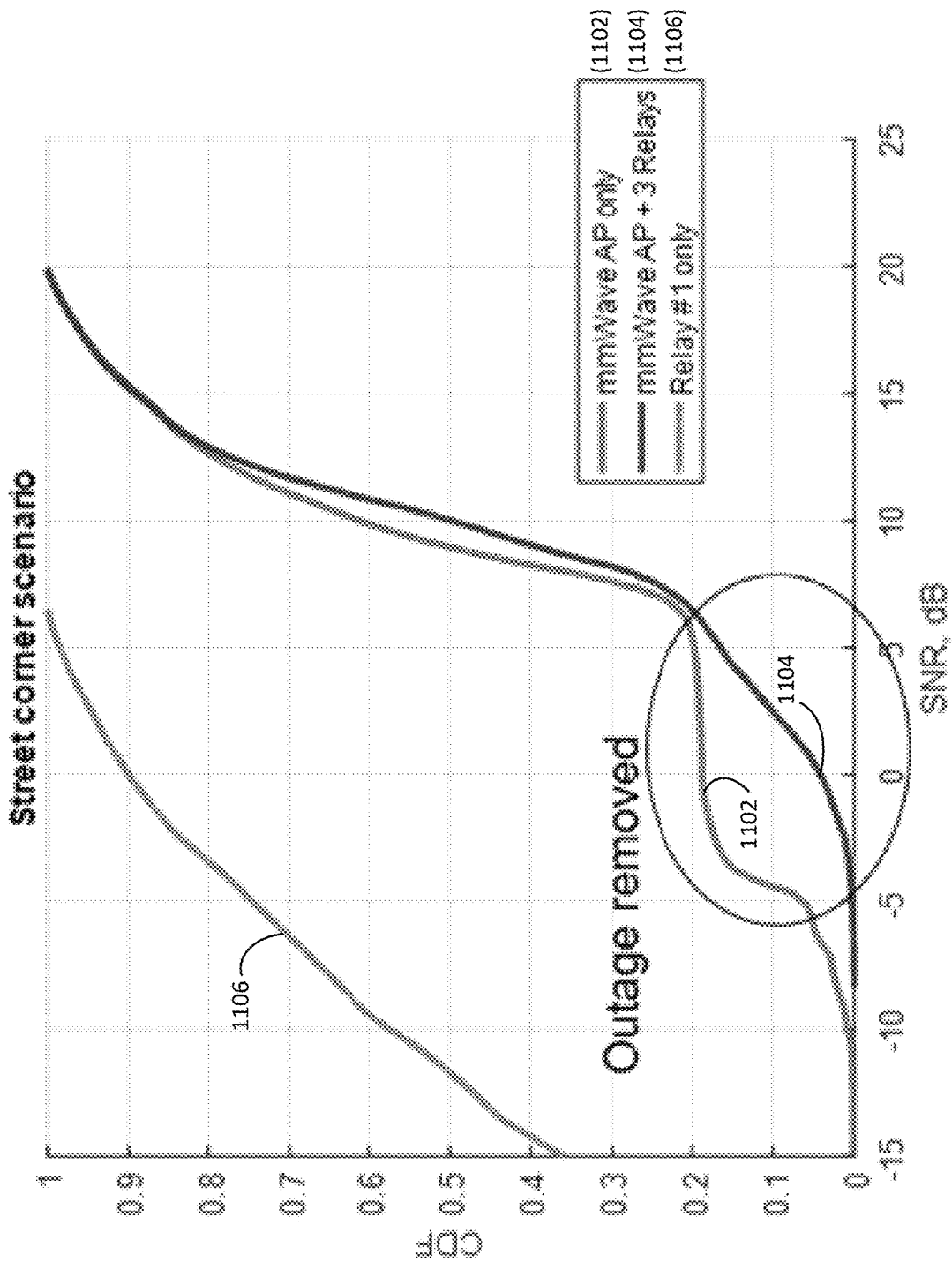

As shown by comparing FIGS. 11A-11B, an SNR analysis of the relays efficiency can be observed by comparison of the SNR distributions in the VR playground 1004 and the resulting SNR CDFs. This is again indicated in the circled region of FIG. 11C, which plots the CDF versus the SNR in dB for the use of only the mmWave AP (1102), the mmWave AP and all 3 relays R1, R2, and R3 (1104), and for only the relay R1 (1106).

Thus, based upon the SNR analysis for selected distributed relay parameters in three typical scenarios, it is shown that deployment of the relays can significantly improve signal reception in shadowed areas.

Figure 12:
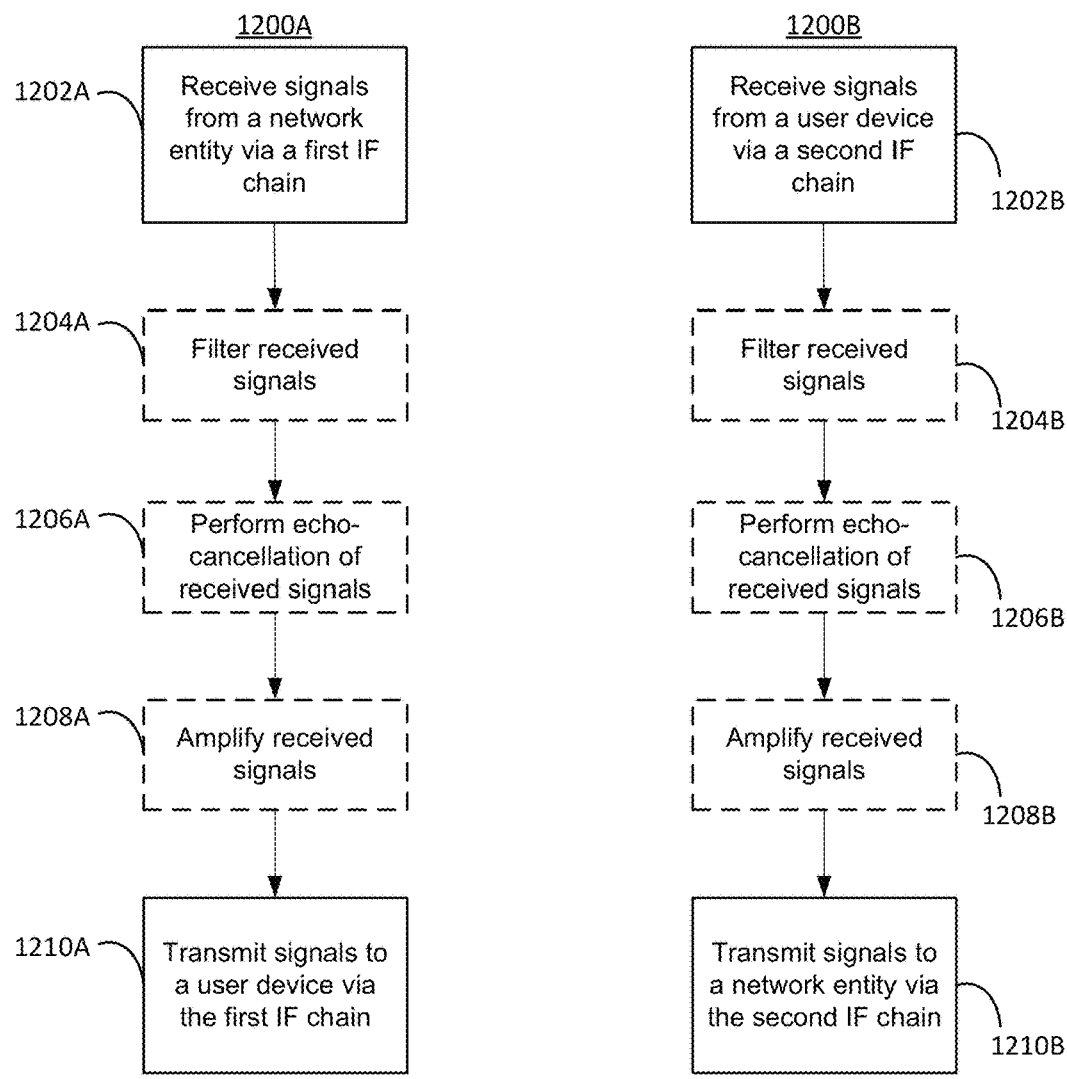
FIG. 12 illustrates a flow diagram of a process implemented by a distributed relay, in accordance with an embodiment of the present disclosure.

FIG. 12 illustrates a flow diagram of a process implemented by a distributed relay system, in accordance with an embodiment of the present disclosure. The flow 1200 as shown in FIG. 12 may be executed by processing circuitry associated with a distributed relay as discussed herein. For example, the flow 1200 may be performed by various components of the upper and lower IF chains as discussed herein with reference to the architecture 300 of the relay 120, as shown in FIG. 3. As another example, the flow 1200 may be executed by the processing circuitry 1310 executing instructions stored in the memory 1304, as discussed below with reference to FIG. 13, in various embodiments.

The flow 1200 may include two (or more, if additional IF chains are implemented by the relay 120, for example), independent flows 1200A and 1200B, as shown in FIG. 12. Each of the flows 1200A and 1200B may be performed independently with respect to one another. The flows 1200A and 1200B may further be performed concurrently (e.g. simultaneously, in parallel, at the same time, etc.) or at any suitable time with respect to one another depending upon the particular application in which the relay 120 is used. For example, the flow 1200A may be performed via one or more components associated with the upper IF chain as discussed herein with reference to the architecture 300 as shown in FIG. 3. Continuing this example, the flow 1200B may be performed via one or more components associated with the lower IF chain as discussed herein with reference to the architecture 300 as shown in FIG. 3.

The flows 1200A, 1200B may each independently begin when each respective upper and lower IF chain receives a signal via its respective antenna and coupled phased array radio module. For the flow 1200A, this may include receiving (block 1202A) a signal from a network entity such as an AP as shown in FIG. 3. For the flow 1200B, this may include receiving (block 1202B) a signal from a user device as shown in FIG. 3.

The flows 1200A, 1200B may also each independently transmit a signal based upon the signals that are received via each respective IF chain (blocks 1202A, 1020B) via each IF chain's respective antenna and coupled phased array radio module. For the flow 1200A, this may include transmitting (block 1210A) a signal to a user device based upon the signal received (block 1202A) from the network entity. For the flow 1200B, this may include transmitting (block 1210B) a signal to a network entity based upon the signal received (block 1202B) from the user device.

As shown in FIG. 12 by the blocks represented with dashed lines, each of the flows 1200A, 1200B may include additional, optional steps. These may be performed, for example, via the IF circuitry associated with each respective IF chain as discussed with reference to the architecture 300 of FIG. 3. For instance, flow 1200A may include the optional steps of filtering the received signals (block 1204A), performing echo-cancellation (block 1206A), and/or amplifying the received signals (block 1208A) to a target amplification value. These may be performed, for example, via the IF circuitry 308A. Likewise, flow 1200B may include the optional steps of filtering the received signals (block 1204B), performing echo-cancellation (block 1206B), and/or amplifying the received signals (block 1208B) to a target amplification value. These may be performed, for example, via the IF circuitry 308B.

FIG. 13 illustrates a device, in accordance with an embodiment of the present disclosure. In an embodiment, FIG. 13 illustrates a block diagram of a communication station 1300 and associated functions that may be suitable for use as relay 120 as discussed herein with reference to FIG. 1. Again, the communication station 1300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1300 may include communications circuitry 1304 and a transceiver 1302 for transmitting and receiving signals to and from other user devices and/or network entities using one or more antennas 1312.1-1312.2. The communications circuitry 1304 may include circuitry that can operate the physical layer (PHY) communications and/or medium access control (MAC) communications for controlling access to the wireless medium, and/or any other communications layers for transmitting and receiving signals. In accordance with some embodiments, the communications circuitry 1304 may be implemented as one or more portions of the IF chains as discussed herein with reference to the architecture 300 of FIG. 3.

For instance, the communications circuitry 1304 may include the IF circuitry 308A, 308B as shown and discussed with reference to FIG. 3. Additionally, the communications circuitry 1304 may include other components of the IF chains such as the splitter/combiners 306A, 306B, 310A, 310B, the reference clock source 314, etc. The communications circuitry 1304 may be configured to contend for a wireless medium and to configure frames or packets for communicating over the wireless medium. The communications circuitry 1304 may be arranged to transmit and receive signals. The communications circuitry 1304 may also include circuitry to perform suitable wireless communications functions, such as modulation/demodulation, upconversion/downconversion, filtering, amplification, etc.

As another example, the transceiver 1302 may be identified with the phased array radio modules 304A, 304B, 312A, 312B as shown and discussed with reference to the architecture 300 of FIG. 3. Continuing this example, although the antennas 1312.1-1312.2 are depicted in FIG. 12 as two antennas, the communication station 1300 may include any suitable number of antennas 1312.1-1312.1302, which may be identified with, for example, the antennas 302.1, 302.2, 302.3, 302.4 as discussed herein with reference to the architecture 300 of FIG. 3.

The communication station 1300 may also include processing circuitry 1310 and memory 1306 configured to perform the operations described herein. The processing circuitry 1310 may be identified with, for example, the FPGA 318 as discussed with reference to the architecture 300 of FIG. 3A or any other suitable hardware processor configured to perform the techniques as discussed herein.

Thus, embodiments include any combination of the transceiver 1302, the communications circuitry 1304, and/or the processing circuitry 1310 being configured to perform operations detailed in the above figures, diagrams, and flows. The memory 1306 may include stored data, or other executable instructions, code, hardware circuitry, etc., represented as the modules shown in FIG. 13. These modules may be read or otherwise executed by the various other components of the communication station 1300 (e.g., the processing circuitry 1310) to perform the various functions as described herein. For example, the first and second IF chain modules 1306.1, 1306.2 may enable the architecture 300 of FIG. 3A to perform the functions described herein with reference to the relay 120, which may include examples such as beamforming functions, receiving and transmitting data, amplifying signals, performing echo cancellation, bandpass filtering, etc.

In some embodiments, the processing circuitry 1310 of the communication station 1300 may include one or more processors. Embodiments include the two or more antennas 1312.1-1312.2 being coupled to the communications circuitry 1304 and configured to send and receive signals. The memory 1306 may store information for configuring the processing circuitry 1310 to perform operations for configuring and transmitting message frames and performing the various operations described herein. The memory 1306 may include any type of memory, including non-transitory computer-readable memory, for storing information in a form readable by a machine (e.g., a computer and/or the processing circuitry 1310). For example, the memory 1306 may include a computer-readable storage device, read-only memory (ROM), random-access memory (RAM), magnetic disk storage media, optical storage media, flash-memory devices and other storage devices and media.

In some embodiments, the communication station 1300 may be part of another portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

Again, although only two antennas 1312.1-1312.2 are shown in FIG. 13, the communication station 1300 may include any suitable number of directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity, and the different channel characteristics that may result between each of the antennas and the antennas of a transmitting station. As discussed herein with reference to FIGS. 4 and 5, the antennas may be positioned with respect to one another in a variety of ways to facilitate a suitable isolation between the antennas.

The components shown in FIG. 13 are by way of example and not limitation, and the communication station may include additional, less, or alternate components as those shown in FIG. 13. For instance, the communication station 1300 may include one or more of a keyboard, a display, a non-volatile memory port, additional antennas, a graphics processor, an application processor, speakers, and other mobile device elements. Such a display may be an LCD screen including a touch screen.

Although the communication station 1300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

FIG. 14 illustrates a block diagram of an example system that may be used to implement any of one or more techniques (e.g., methods), in accordance with an embodiment of the present disclosure. In other embodiments, the system 1400 may operate as a standalone device or may be connected (e.g., networked) to other devices. In a networked deployment, the system 1400 may operate in the capacity of a server machine, a client machine, or both in server-client network environments. In an example, the system 1400 may act as a peer machine in peer-to-peer (P2P) (or other distributed) network environments. The system 1400 may be implemented as part of (or the entirety of) the communications station 1300 as discussed with reference to FIG. 13, and thus the system 1400 may likewise be implemented as any suitable type of device such as a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single system is illustrated, the term "system" may include any collection of machines, other systems, and/or other components or devices, which may individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The system (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The system 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The system 1400 may additionally include a storage device (i.e., drive unit) 1416, a signal generation device 1418 (e.g., a speaker), a distributed relay device 1419, a network interface device/transceiver 1420 coupled to antenna(s) 1430, and one or more sensors 1428, such as a global positioning system (GPS) sensor, a compass, an accelerometer, or other sensor.

The system 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor or another suitable processor (e.g., the hardware processor 1402). The baseband processor may be configured to generate corresponding baseband signals. The baseband processor may further include physical layer (PHY) and medium access control layer (MAC) circuitry, and may further interface with the hardware processor 1402 for generation and processing of the baseband signals and for controlling operations of the main memory 1404, the storage device 1416, and/or the distributed relay device 1419. The baseband processor may be provided on a single radio card, a single chip, or an integrated circuit (IC).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the system 1400. In an example, one or any combination of the hardware processor 1402, the main memory 1404, the static memory 1406, or the storage device 1416 may constitute machine-readable media.

The distributed relay device 1419 may carry out or perform any of the operations and processes (e.g., flows 1200A, 1200B) described and shown above and, in an embodiment, may be an implementation of the relay 120 as discussed herein and with further reference to FIG. 1.

It is understood that the above are only a subset of what the distributed relay device 1419 may be configured to perform, and that other functions included throughout this disclosure may also be performed by the distributed relay device 1419.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the system 1400 and that cause the system 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the system 1400 and includes digital or analog communications signals or other intangible media to facilitate communication of such software.

CONCLUSION

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art (e.g., a gNodeB). An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

EXAMPLES

The following examples pertain to further aspects.

Example 1. A device, comprising: a donor side including a donor receive antenna and a donor transmit antenna, the donor receive antenna being coupled to first receive intermediate frequency (IF) circuitry included in a first IF chain, and the donor transmit antenna being coupled to first transmit IF circuitry included in a second IF chain, an access side including an access transmit antenna and an access receive antenna, the access transmit antenna being coupled to second transmit IF circuitry included in the first IF chain, and the access receive antenna being coupled to second receive IF circuitry included in the second IF chain, wherein the first IF chain is configured to enable the access transmit antenna to transmit signals based on signals received via the donor receive antenna, wherein the second IF chain is configured to enable the donor transmit antenna to transmit signals based on signals received via the access receive antenna, wherein the first receive IF circuitry and the first transmit IF circuitry are physically separated from one another, and the second receive IF circuitry and the second transmit IF circuitry are physically separated from one another, and wherein the first IF chain and the second IF chain are configured to receive signals and transmit signals independently of one another.

Example 2. The subject matter of Example 1, wherein: the donor receive antenna and the donor transmit antenna are each configured to operate in accordance with an adjustable beam pattern, and the access transmit antenna and the access receive antenna are each configured to operate in accordance with an adjustable beam pattern that enables a pseudo-omnidirectional operation of each of the access transmit antenna and the access receive antenna.

Example 3. The subject matter of any combination of Examples 1-2, wherein the adjustable beam pattern associated with each of the donor receive antenna and the donor transmit antenna has a narrower beamwidth compared to the adjustable beam pattern associated with each of the access transmit antenna and the access receive antenna.

Example 4. The subject matter of any combination of Examples 1-3, wherein the first transmit IF circuitry transmits signals over the physical separation between the first transmit IF circuitry and the first receive IF circuitry in the IF domain via a first transmission medium, and wherein the second transmit IF circuitry transmits signals over the physical separation between the second transmit IF circuitry and the second receive IF circuitry in the IF domain via a second transmission medium.

Example 5. The subject matter of any combination of Examples 1-4, wherein each of the donor transmit antenna, the donor receive antenna, the access transmit antenna, and the access receive antenna includes two phased antenna arrays, each separate one of the two phased arrays being associated with one of two different polarizations.

Example 6. The subject matter of any combination of Examples 1-5, wherein each of the donor transmit antenna, the donor receive antenna, the access transmit antenna, and the access receive antenna each comprises a phased array antenna and includes an elliptical dielectric lens or a Fresnel dielectric lens.

Example 7. The subject matter of any combination of Examples 1-6, wherein a minimum isolation between any one of the donor transmit antenna and the donor receive antenna is −49 decibels (dB), and wherein a minimum isolation between any one of the access transmit antenna and the access receive antenna is −84 dB.

Example 8. The subject matter of any combination of Examples 1-7, wherein: the first and the second transmission mediums are air, the first transmit IF circuitry transmits signals in the IF domain to the first receive IF circuitry via a first wireless link, and the second transmit IF circuitry transmits signals in the IF domain to the second receive IF circuitry via a second wireless link.

Example 9. The subject matter of any combination of Examples 1-8, wherein the first IF chain includes a first amplifier configured to amplify signals received via the donor receive antenna such that the received signals are transmitted via the access transmit antenna at a first target amplification value, and wherein the second IF chain includes a second amplifier configured to amplify signals received via the access receive antenna such that the received signals are transmitted via the donor transmit antenna at a second target amplification value.

Example 10. The subject matter of any combination of Examples 1-9, wherein the first target amplification value and the second target amplification value is 40 decibels (dB).

Example 11. The subject matter of any combination of Examples 1-10, wherein the first IF chain includes first echo cancellation circuitry configured to suppress echo signals as a result of the signals that are transmitted via the donor transmit antenna being coupled into the first IF chain via the donor receive antenna, and wherein the second IF chain includes second echo cancellation circuitry configured to suppress echo signals as a result of the signals that are transmitted via the access transmit antenna being coupled into the second IF chain via the access receive antenna.

Example 12. The subject matter of any combination of Examples 1-11, wherein the first IF chain and the second IF chain are configured to receive and transmit signals without performing a downconversion of signals received via the donor receive antenna or the access receive antenna to baseband.

Example 13. The subject matter of any combination of Examples 1-12, wherein the donor receive antenna and the donor transmit antenna are each configured to receive signals from and to transmit signals to, respectively, a first gNodeB, and wherein the access receive antenna and the access transmit antenna are each configured to receive signals from and to transmit signals to, respectively, a second gNodeB.

Example 14. A method implemented via one or more processors of a relay comprising a donor side including a donor receive antenna and a donor transmit antenna, and comprising an access side including an access transmit antenna and an access receive antenna, the method comprising: transmitting, via the donor transmit antenna using a first IF chain that is coupled to the access receive antenna and to the donor transmit antenna, signals based on signals received via the access receive antenna; and transmitting, via the access transmit antenna using a second IF chain that is coupled to the donor receive antenna and to the access transmit antenna, signals based on signals received via the donor receive antenna, wherein the acts of transmitting and receiving signals via the first IF chain and the second IF chain occur independently of one another.

Example 15. The subject matter of Example 14, wherein act of transmitting signals using the first IF chain via the donor transmit antenna includes amplifying signals received via the access receive antenna such that the received signals are transmitted via the donor transmit antenna at a first target amplification value, and wherein the act of transmitting signals using the second IF chain via the access transmit antenna includes amplifying signals received via the donor receive antenna such that the received signals are transmitted via the access transmit antenna at a second target amplification value.

Example 16. The subject matter of any combination of Examples 14-15, wherein the first target amplification value and the second target amplification value is 40 decibels (dB).

Example 17. The subject matter of any combination of Examples 14-16, wherein the act of transmitting signals using the first IF chain via the donor transmit antenna includes suppressing, via first echo cancellation circuitry, echo signals as a result of the signals that are transmitted via the donor transmit antenna being coupled into the first IF chain via the donor receive antenna, and wherein the act of transmitting signals using the second IF chain via the access transmit antenna includes suppressing, via second echo cancellation circuitry, echo signals as a result of the signals that are transmitted via the access transmit antenna being coupled into the second IF chain via the access receive antenna.

Example 18. The subject matter of any combination of Examples 14-17, wherein the acts of transmitting and receiving signals via the first IF chain and the second IF chain independently of one another comprise transmitting and receiving signals without performing a downconversion of signals received via the donor receive antenna or the access receive antenna to baseband.

Example 19. A non-transitory computer-readable media of a relay having instructions stored thereon, the relay comprising a donor side including a donor receive antenna and a donor transmit antenna, and comprising an access side including an access transmit antenna and an access receive antenna, the instructions being executed by one or more processors of the relay to cause the relay to: transmit, via the donor transmit antenna using a first IF chain that is coupled to the access receive antenna and to the donor transmit antenna, signals based on signals received via the access receive antenna; and transmit, via the access transmit antenna using a second IF chain that is coupled to the donor receive antenna and to the access transmit antenna, signals based on signals received via the donor receive antenna, wherein transmitting and receiving signals occurs independently via each of the first IF chain and the second IF chain.

Example 20. The subject matter of Example 19, wherein the instructions to transmit signals using the first IF chain via the donor transmit antenna include instructions to cause the relay to amplify signals received via the access receive antenna such that the received signals are transmitted via the donor transmit antenna at a first target amplification value, and wherein the instructions to transmit signals using the second IF chain via the access transmit antenna include instructions to cause the relay to amplify signals received via the donor receive antenna such that the received signals are transmitted via the access transmit antenna at a second target amplification value.

Example 21. The subject matter of any combination of Examples 19-20, wherein the instructions to transmit signals using the first IF chain via the donor transmit antenna include instructions to cause the relay to suppress, via first echo cancellation circuitry, echo signals as a result of the signals that are transmitted via the donor transmit antenna being coupled into the first IF chain via the donor receive antenna, and wherein the instructions to transmit signals using the second IF chain via the access transmit antenna includes suppressing, via second echo cancellation circuitry, echo signals as a result of the signals that are transmitted via the access transmit antenna being coupled into the second IF chain via the access receive antenna.

Example 22. The subject matter of any combination of Examples 19-21, wherein the instructions to transmit and receive signals via the first IF chain and the second IF chain occur independently of one another include instructions to cause the relay to transmit and receive signals without performing a downconversion of signals received via the donor receive antenna or the access receive antenna to baseband.

Example 1A. A device, comprising: a donor side means including a donor receive antenna and a donor transmit antenna, the donor receive antenna being coupled to first receive intermediate frequency (IF) means included in a first IF chain, and the donor transmit antenna being coupled to first transmit IF means included in a second IF chain, an access side means including an access transmit antenna and an access receive antenna, the access transmit antenna being coupled to second transmit IF means included in the first IF chain, and the access receive antenna being coupled to second receive IF means included in the second IF chain, wherein the first IF chain is configured to enable the access transmit antenna to transmit signals based on signals received via the donor receive antenna, wherein the second IF chain is configured to enable the donor transmit antenna to transmit signals based on signals received via the access receive antenna, wherein the first receive IF means and the first transmit IF means are physically separated from one another, and the second receive IF means and the second transmit IF means are physically separated from one another, and wherein the first IF chain and the second IF chain are configured to receive signals and transmit signals independently of one another.

Example 2A. The subject matter of Example 1A, wherein: the donor receive antenna and the donor transmit antenna are each configured to operate in accordance with an adjustable beam pattern, and the access transmit antenna and the access receive antenna are each configured to operate in accordance with an adjustable beam pattern that enables a pseudo-omnidirectional operation of each of the access transmit antenna and the access receive antenna.

Example 3A. The subject matter of any combination of Examples 1A-2A, wherein the adjustable beam pattern associated with each of the donor receive antenna and the donor transmit antenna has a narrower beamwidth compared to the adjustable beam pattern associated with each of the access transmit antenna and the access receive antenna.

Example 4A. The subject matter of any combination of Examples 1A-3A, wherein the first transmit IF circuitry transmits signals over the physical separation between the first transmit IF means and the first receive IF means in the IF domain via a first transmission medium, and wherein the second transmit IF circuitry transmits signals over the physical separation between the second transmit IF means and the second receive IF means in the IF domain via a second transmission medium.

Example 5A. The subject matter of any combination of Examples 1A-4A, wherein each of the donor transmit antenna, the donor receive antenna, the access transmit antenna, and the access receive antenna includes two phased antenna arrays, each separate one of the two phased arrays being associated with one of two different polarizations.

Example 6A. The subject matter of any combination of Examples 1A-5A, wherein each of the donor transmit antenna, the donor receive antenna, the access transmit antenna, and the access receive antenna each comprises a phased array antenna and includes an elliptical dielectric lens or a Fresnel dielectric lens.

Example 7A. The subject matter of any combination of Examples 1A-6A, wherein a minimum isolation between any one of the donor transmit antenna and the donor receive antenna is −49 decibels (dB), and wherein a minimum isolation between any one of the access transmit antenna and the access receive antenna is −84 dB.

Example 8A. The subject matter of any combination of Examples 1A-7A, wherein: the first and the second transmission mediums are air, the first transmit IF means transmits signals in the IF domain to the first receive IF means via a first wireless link, and the second transmit IF means transmits signals in the IF domain to the second receive IF means via a second wireless link.

Example 9A. The subject matter of any combination of Examples 1A-8A, wherein the first IF chain includes a first amplifier means for amplifying signals received via the donor receive antenna such that the received signals are transmitted via the access transmit antenna at a first target amplification value, and wherein the second IF chain includes a second amplifier means for amplifying signals received via the access receive antenna such that the received signals are transmitted via the donor transmit antenna at a second target amplification value.

Example 10A. The subject matter of any combination of Examples 1A-9A, wherein the first target amplification value and the second target amplification value is 40 decibels (dB).

Example 11A. The subject matter of any combination of Examples 1A-10A, wherein the first IF chain includes first echo cancellation means for suppressing echo signals as a result of the signals that are transmitted via the donor transmit antenna being coupled into the first IF chain via the donor receive antenna, and wherein the second IF chain includes second echo cancellation means for suppressing echo signals as a result of the signals that are transmitted via the access transmit antenna being coupled into the second IF chain via the access receive antenna.

Example 12A. The subject matter of any combination of Examples 1A-11A, wherein the first IF chain and the second IF chain are configured to receive and transmit signals without performing a downconversion of signals received via the donor receive antenna or the access receive antenna to baseband.

Example 13A. The subject matter of any combination of Examples 1A-12A, wherein the donor receive antenna and the donor transmit antenna are each configured to receive signals from and to transmit signals to, respectively, a first gNodeB, and wherein the access receive antenna and the access transmit antenna are each configured to receive signals from and to transmit signals to, respectively, a second gNodeB.

Example 14A. A method implemented via one or more processors of a relay comprising a donor side means including a donor receive antenna and a donor transmit antenna, and comprising an access side means including an access transmit antenna and an access receive antenna, the method comprising: transmitting, via the donor transmit antenna using a first IF chain that is coupled to the access receive antenna and to the donor transmit antenna, signals based on signals received via the access receive antenna; and transmitting, via the access transmit antenna using a second IF chain that is coupled to the donor receive antenna and to the access transmit antenna, signals based on signals received via the donor receive antenna, wherein the acts of transmitting and receiving signals via the first IF chain and the second IF chain occur independently of one another.

Example 15A. The subject matter of Example 14A, wherein act of transmitting signals using the first IF chain via the donor transmit antenna includes amplifying signals received via the access receive antenna such that the received signals are transmitted via the donor transmit antenna at a first target amplification value, and wherein the act of transmitting signals using the second IF chain via the access transmit antenna includes amplifying signals received via the donor receive antenna such that the received signals are transmitted via the access transmit antenna at a second target amplification value.

Example 16A. The subject matter of any combination of Examples 14A-15A, wherein the first target amplification value and the second target amplification value is 40 decibels (dB).

Example 17A. The subject matter of any combination of Examples 14A-16A, wherein the act of transmitting signals using the first IF chain via the donor transmit antenna includes suppressing, via first echo cancellation means, echo signals as a result of the signals that are transmitted via the donor transmit antenna being coupled into the first IF chain via the donor receive antenna, and wherein the act of transmitting signals using the second IF chain via the access transmit antenna includes suppressing, via second echo cancellation means, echo signals as a result of the signals that are transmitted via the access transmit antenna being coupled into the second IF chain via the access receive antenna.

Example 18A. The subject matter of any combination of Examples 14A-17A, wherein the acts of transmitting and receiving signals via the first IF chain and the second IF chain independently of one another comprise transmitting and receiving signals without performing a downconversion of signals received via the donor receive antenna or the access receive antenna to baseband.

Example 19A. A non-transitory computer-readable media means of a relay having instructions stored thereon, the relay comprising a donor side means including a donor receive antenna and a donor transmit antenna, and comprising a access side means including an access transmit antenna and an access receive antenna, the instructions being executed by one or more processors of the relay to cause the relay to: transmit, via the donor transmit antenna using a first IF chain that is coupled to the access receive antenna and to the donor transmit antenna, signals based on signals received via the access receive antenna; and transmit, via the access transmit antenna using a second IF chain that is coupled to the donor receive antenna and to the access transmit antenna, signals based on signals received via the donor receive antenna, wherein transmitting and receiving signals occurs independently via each of the first IF chain and the second IF chain.

Example 20A. The subject matter of Example 19A, wherein the instructions to transmit signals using the first IF chain via the donor transmit antenna include instructions to cause the relay to amplify signals received via the access receive antenna such that the received signals are transmitted via the donor transmit antenna at a first target amplification value, and wherein the instructions to transmit signals using the second IF chain via the access transmit antenna include instructions to cause the relay to amplify signals received via the donor receive antenna such that the received signals are transmitted via the access transmit antenna at a second target amplification value.

Example 21A. The subject matter of any combination of Examples 19A-20A, wherein the instructions to transmit signals using the first IF chain via the donor transmit antenna include instructions to cause the relay to suppress, via first echo cancellation means, echo signals as a result of the signals that are transmitted via the donor transmit antenna being coupled into the first IF chain via the donor receive antenna, and wherein the instructions to transmit signals using the second IF chain via the access transmit antenna includes suppressing, via second echo cancellation means, echo signals as a result of the signals that are transmitted via the access transmit antenna being coupled into the second IF chain via the access receive antenna.

Example 22A. The subject matter of any combination of Examples 19A-21A, wherein the instructions to transmit and receive signals via the first IF chain and the second IF chain occur independently of one another include instructions to cause the relay to transmit and receive signals without performing a downconversion of signals received via the donor receive antenna or the access receive antenna to baseband.

An apparatus as shown and described.
A method as shown and described.
What is claimed is:

1. A device, comprising:
   a donor side including a donor receive antenna and a donor transmit antenna, the donor receive antenna being coupled to first receive intermediate frequency (IF) circuitry included in a first IF chain, and the donor transmit antenna being coupled to first transmit IF circuitry included in a second IF chain; and
   an access side including an access transmit antenna and an access receive antenna, the access transmit antenna being coupled to second transmit IF circuitry included in the first IF chain, and the access receive antenna being coupled to second receive IF circuitry included in the second IF chain,
   wherein the first IF chain is configured to enable the access transmit antenna to transmit signals based on signals received via the donor receive antenna,
   wherein the second IF chain is configured to enable the donor transmit antenna to transmit signals based on signals received via the access receive antenna,
   wherein the first receive IF circuitry and the first transmit IF circuitry are physically separated from one another, and the second receive IF circuitry and the second transmit IF circuitry are physically separated from one another, and
   wherein the first IF chain and the second IF chain are configured to receive signals and transmit signals independently of one another.

2. The device of claim 1, wherein:
   the donor receive antenna and the donor transmit antenna are each configured to operate in accordance with an adjustable beam pattern, and
   the access transmit antenna and the access receive antenna are each configured to operate in accordance with an adjustable beam pattern that enables a pseudo-omnidirectional operation of each of the access transmit antenna and the access receive antenna.

3. The device of claim 2, wherein the adjustable beam pattern associated with each of the donor receive antenna and the donor transmit antenna has a narrower beamwidth compared to the adjustable beam pattern associated with each of the access transmit antenna and the access receive antenna.

4. The device of claim 1, wherein the first transmit IF circuitry transmits signals over the physical separation between the first transmit IF circuitry and the first receive IF circuitry in an IF domain via a first transmission medium, and
   wherein the second transmit IF circuitry transmits signals over the physical separation between the second transmit IF circuitry and the second receive IF circuitry in an IF domain via a second transmission medium.

5. The device of claim 4, wherein:
   the first and the second transmission mediums are air,
   the first transmit IF circuitry transmits signals in the IF domain to the first receive IF circuitry via a first wireless link, and
   the second transmit IF circuitry transmits signals in the IF domain to the second receive IF circuitry via a second wireless link.

6. The device of claim 1, wherein each of the donor transmit antenna, the donor receive antenna, the access transmit antenna, and the access receive antenna includes two phased antenna arrays, each separate one of the two phased arrays being associated with one of two different polarizations.

7. The device of claim 1, wherein each of the donor transmit antenna, the donor receive antenna, the access transmit antenna, and the access receive antenna each comprises a phased array antenna and includes an elliptical dielectric lens or a Fresnel dielectric lens.

8. The device of claim 1, wherein a minimum isolation between any one of the donor transmit antenna and the donor receive antenna is −49 decibels (dB), and
wherein a minimum isolation between any one of the access transmit antenna and the access receive antenna is −84 dB.

9. The device of claim 1, wherein the first IF chain includes a first amplifier configured to amplify signals received via the donor receive antenna such that the received signals are transmitted via the access transmit antenna at a first target amplification value, and
wherein the second IF chain includes a second amplifier configured to amplify signals received via the access receive antenna such that the received signals are transmitted via the donor transmit antenna at a second target amplification value.

10. The device of claim 9, wherein the first target amplification value and the second target amplification value is 40 decibels (dB).

11. The device of claim 1, wherein the first IF chain includes first echo cancellation circuitry configured to suppress echo signals as a result of the signals that are transmitted via the donor transmit antenna being coupled into the first IF chain via the donor receive antenna, and
wherein the second IF chain includes second echo cancellation circuitry configured to suppress echo signals as a result of the signals that are transmitted via the access transmit antenna being coupled into the second IF chain via the access receive antenna.

12. The device of claim 1, wherein the first IF chain and the second IF chain are configured to receive and transmit signals without performing a downconversion to baseband of signals received via the donor receive antenna or the access receive antenna.

13. The device of claim 1, wherein the donor receive antenna and the donor transmit antenna are each configured to receive signals from and to transmit signals to, respectively, a first gNodeB, and
wherein the access receive antenna and the access transmit antenna are each configured to receive signals from and to transmit signals to, respectively, a second gNodeB.

14. A method implemented via one or more processors of a relay comprising (i) a donor side including a donor receive antenna and a donor transmit antenna, the donor receive antenna being coupled to first receive intermediate frequency (IF) circuitry included in a first IF chain, and the donor transmit antenna being coupled to first transmit IF circuitry included in a second IF chain, and (ii) an access side including an access transmit antenna and an access receive antenna, the access transmit antenna being coupled to second transmit IF included in the first IF chain, and the access receive antenna being coupled to second receive IF circuitry included in the second IF chain, the method comprising:
transmitting, via the donor transmit antenna using the first IF chain that is coupled to the access receive antenna and to the donor transmit antenna, signals based on signals received via the access receive antenna; and
transmitting, via the access transmit antenna using the second IF chain that is coupled to the donor receive antenna and to the access transmit antenna, signals based on signals received via the donor receive antenna,
wherein the transmitting and receiving of signals via the first IF chain and the second IF chain occur independently of one another,
wherein the first receive IF circuitry and the first transmit IF circuitry are physically separated from one another, and
wherein the second receive IF circuitry and the second transmit IF circuitry are physically separated from one another.

15. The method of claim 14, wherein the transmitting of signals using the first IF chain via the donor transmit antenna includes amplifying signals received via the access receive antenna such that the received signals are transmitted via the donor transmit antenna at a first target amplification value, and
wherein the transmitting of signals using the second IF chain via the access transmit antenna includes amplifying signals received via the donor receive antenna such that the received signals are transmitted via the access transmit antenna at a second target amplification value.

16. The method of claim 15, wherein the first target amplification value and the second target amplification value is 40 decibels (dB).

17. The method of claim 14, wherein the transmitting of signals using the first IF chain via the donor transmit antenna includes suppressing, via first echo cancellation circuitry, echo signals as a result of the signals that are transmitted via the donor transmit antenna being coupled into the first IF chain via the donor receive antenna, and
wherein the transmitting of signals using the second IF chain via the access transmit antenna includes suppressing, via second echo cancellation circuitry, echo signals as a result of the signals that are transmitted via the access transmit antenna being coupled into the second IF chain via the access receive antenna.

18. The method of claim 14, wherein the transmitting and receiving of signals via the first IF chain and the second IF chain independently of one another comprise transmitting and receiving signals without performing a downconversion to baseband of signals received via the donor receive antenna or the access receive antenna.

19. A non-transitory computer-readable media of a relay having instructions stored thereon, the relay comprising (i) a donor side including a donor receive antenna and a donor transmit antenna, the donor receive antenna being coupled to first receive intermediate frequency (IF) circuitry included in a first IF chain, and the donor transmit antenna being coupled to first transmit IF circuitry included in a second IF chain, and (ii) an access side including an access transmit antenna and an access receive antenna, the access transmit antenna being coupled to second transmit IF circuitry included in the first IF chain, and the access receive antenna being coupled to second receive IF circuitry included in the second IF chain, the instructions being executed by one or more processors of the relay to cause the relay to:
transmit, via the donor transmit antenna using a first IF chain that is coupled to the access receive antenna and to the donor transmit antenna, signals based on signals received via the access receive antenna; and transmit, via the access transmit antenna using a second IF chain that is coupled to the donor receive antenna and to the access transmit antenna, signals based on signals received via the donor receive antenna, wherein the transmitting and receiving of signals via each of the first IF chain and the second IF chain occurs independently of one another, wherein the first receive IF circuitry and the first transmit IF circuitry are physically separated from one another, and wherein the second receive IF circuitry and the second transmit IF circuitry are physically separated from one another.

20. The non-transitory computer-readable media of claim 19 wherein the instructions to transmit signals using the first IF chain via the donor transmit antenna include instructions to cause the relay to amplify signals received via the access receive antenna such that the received signals are transmitted via the donor transmit antenna at a first target amplification value, and wherein the instructions to transmit signals using the second IF chain via the access transmit antenna include instructions to cause the relay to amplify signals received via the donor receive antenna such that the received signals are transmitted via the access transmit antenna at a second target amplification value.

21. The non-transitory computer-readable media of claim 19, wherein the instructions to transmit signals using the first IF chain via the donor transmit antenna include instructions to cause the relay to suppress, via first echo cancellation circuitry, echo signals as a result of the signals that are transmitted via the donor transmit antenna being coupled into the first IF chain via the donor receive antenna, and wherein the instructions to transmit signals using the second IF chain via the access transmit antenna include instructions to cause the relay to suppress, via second echo cancellation circuitry, echo signals as a result of the signals that are transmitted via the access transmit antenna being coupled into the second IF chain via the access receive antenna.

22. The non-transitory computer-readable media of claim 19, wherein the instructions to transmit and receive signals via the first IF chain and the second IF chain independently of one another include instructions to cause the relay to transmit and receive signals without performing a downconversion to baseband of signals received via the donor receive antenna or the access receive antenna.

\* \* \* \* \*